US010813824B2

(12) United States Patent
van den Dries et al.

(10) Patent No.: US 10,813,824 B2
(45) Date of Patent: Oct. 27, 2020

(54) MULTI-LAYERED MASSAGE TOOL

(71) Applicant: Rocktape, Inc., Campbell, CA (US)

(72) Inventors: Gregory van den Dries, Los Gatos, CA (US); Steven Capobianco, Highlands Ranch, CO (US); Cullen Maxwell Maroney, Campbell, CA (US)

(*) Notice: Subject to any disclaimer, the term of this patent is extended or adjusted under 35 U.S.C. 154(b) by 592 days.

(21) Appl. No.: 15/505,077

(22) PCT Filed: Feb. 24, 2016

(86) PCT No.: PCT/US2016/019239
§ 371 (c)(1),
(2) Date: Feb. 27, 2017

(87) PCT Pub. No.: WO2017/048318
PCT Pub. Date: Mar. 23, 2017

(65) Prior Publication Data
US 2017/0340509 A1 Nov. 30, 2017

(51) Int. Cl.
*A61H 7/00* (2006.01)
*B29C 45/16* (2006.01)
(Continued)

(52) U.S. Cl.
CPC ............. *A61H 7/003* (2013.01); *A61H 39/04* (2013.01); *B29C 45/14* (2013.01);
(Continued)

(58) Field of Classification Search
CPC .......... A61H 2201/1253; A63B 21/075; A63B 23/14; A63B 23/16
See application file for complete search history.

(56) References Cited

U.S. PATENT DOCUMENTS 4,461,285 A 7/1984 Courtin
4,546,782 A 10/1985 Kucher
(Continued)

FOREIGN PATENT DOCUMENTS

CH 10702 A 6/1895
CN 1065991 A 11/1992
(Continued)

OTHER PUBLICATIONS

Reliance Foundry, "Cast Iron vs. Cast Steel" Dec. 31, 2015, archive: https://web.archive.org/web/20151231040439/http://www.reliance-foundry.com:80/blog/cast-iron-vs-cast-steel (Year: 2015).*
(Continued)

*Primary Examiner* — Samchuan C Yao
*Assistant Examiner* — Matthew Standard
(74) *Attorney, Agent, or Firm* — Young's Patent Services, LLC; Bruce A Young

(57) ABSTRACT

A multi-layered hand-held massage tool for fascial manipulation includes a weight plate having a first side, a second side opposite from the first side, and an outer edge. The massage tool also includes a first outer layer located on the first side of the weight plate to form a first side of the massage tool, and a second outer layer located on the second side of the weight plate to form a second side of the massage tool. The multi-layered hand-held massage tool has a massage surface, adapted for fascial manipulation, coupling the first side of the massage tool to the second side of the massage tool and covering at least a portion of the outer edge of the weight plate.

22 Claims, 17 Drawing Sheets

(51) Int. Cl.

| | | |
|---|---|---|
| *B32B 15/08* | (2006.01) | |
| *B32B 15/18* | (2006.01) | |
| *B32B 27/06* | (2006.01) | |
| *B32B 9/04* | (2006.01) | |
| *B32B 21/08* | (2006.01) | |
| *B32B 3/26* | (2006.01) | |
| *B29C 45/14* | (2006.01) | |
| *B32B 7/12* | (2006.01) | |
| *B32B 7/04* | (2019.01) | |
| *A61H 39/04* | (2006.01) | |
| *B29L 31/00* | (2006.01) | |
| *B67B 7/16* | (2006.01) | |

(52) U.S. Cl.
CPC .... *B29C 45/14631* (2013.01); *B29C 45/1671* (2013.01); *B32B 3/266* (2013.01); *B32B 7/04* (2013.01); *B32B 7/12* (2013.01); *B32B 9/045* (2013.01); *B32B 15/08* (2013.01); *B32B 15/18* (2013.01); *B32B 21/08* (2013.01); *B32B 27/06* (2013.01); *A61H 2201/1253* (2013.01); *A61H 2201/1635* (2013.01); *B29C 2045/14327* (2013.01); *B29L 2031/753* (2013.01); *B32B 2555/00* (2013.01); *B67B 7/16* (2013.01)

(56) References Cited

U.S. PATENT DOCUMENTS

| | | |
|---|---|---|
| 4,590,926 A | 5/1986 | Courtin |
| 5,231,977 A | 8/1993 | Graston |
| 5,275,281 A | 1/1994 | Ebeling |
| 5,366,437 A | 11/1994 | Graston |
| 5,441,478 A | 8/1995 | Graston |
| D362,168 S | 9/1995 | Mancini |
| D374,388 S | 10/1996 | Padden |
| 5,688,063 A | 11/1997 | Yu et al. |
| 5,707,346 A | 1/1998 | Graston |
| 5,817,037 A * | 10/1998 | Zurbay ............. A61H 7/003 601/135 |
| 5,933,893 A | 8/1999 | Padden |
| 6,009,584 A * | 1/2000 | Padden ............. A46B 7/023 15/201 |
| 6,077,239 A | 6/2000 | Lin |
| 6,126,620 A | 10/2000 | Graston |
| 6,241,694 B1* | 6/2001 | Goulding-Thompson ................. A61H 7/001 601/134 |
| 6,241,696 B1 | 6/2001 | York |
| 6,254,555 B1 | 7/2001 | Sevier et al. |
| 6,267,738 B1* | 7/2001 | Louis ............. A61H 1/008 601/118 |
| 7,125,186 B1 | 10/2006 | Stokes |
| D542,926 S | 5/2007 | Louis |
| 7,431,706 B2 | 10/2008 | Louis |
| D585,262 S | 1/2009 | Cheldin |
| D615,210 S | 5/2010 | Woodhams et al. |
| D632,400 S | 2/2011 | Bludorn |
| D634,173 S | 3/2011 | Kenny |
| 8,057,412 B2* | 11/2011 | Tsai ............. A61H 1/0292 601/135 |
| D665,916 S | 8/2012 | Zhang et al. |
| D677,394 S | 3/2013 | Grust et al. |
| D681,417 S | 5/2013 | Packard et al. |
| D683,862 S | 6/2013 | Hartman |
| 8,484,785 B1 | 7/2013 | Kristiansen et al. |
| D687,287 S | 8/2013 | Chen |
| D710,179 S | 8/2014 | Thomas et al. |
| 8,801,642 B1 | 8/2014 | Slominski |
| 9,023,078 B2 | 5/2015 | Dehors |
| D731,072 S | 6/2015 | Dries et al. |
| RE45,657 E | 8/2015 | Cho |
| D752,238 S | 3/2016 | Stock |
| D753,317 S | 4/2016 | Eddy et al. |
| D757,281 S | 5/2016 | Hsieh |
| D792,600 S | 7/2017 | Dries et al. |
| D792,601 S | 7/2017 | Dries et al. |
| 2004/0203332 A1 | 10/2004 | Hendrickson |
| 2004/0249324 A1* | 12/2004 | Louis ............. A61H 7/003 601/135 |
| 2005/0060894 A1 | 3/2005 | Armstrong |
| 2006/0174489 A1* | 8/2006 | Kohler ............. A45C 11/20 30/143 |
| 2006/0293619 A1* | 12/2006 | Louis ............. A61H 7/001 601/135 |
| 2009/0177210 A1 | 7/2009 | Durso |
| 2011/0172573 A1 | 7/2011 | Wallace |
| 2012/0100516 A1 | 4/2012 | Iwami et al. |
| 2014/0082850 A1 | 3/2014 | Stokes et al. |
| 2014/0208594 A1 | 7/2014 | Scimone et al. |
| 2014/0213944 A1 | 7/2014 | Kojima |
| 2014/0358045 A1 | 12/2014 | Toto |
| 2015/0231014 A1* | 8/2015 | Capobianco ............. B25F 1/00 601/135 |
| 2016/0166459 A1* | 6/2016 | Ghosh ............. A61H 7/001 601/137 |

FOREIGN PATENT DOCUMENTS

| | | |
|---|---|---|
| CN | 202191470 U | 4/2012 |
| JP | 2003102796 A | 4/2003 |
| JP | 2004244098 A | 9/2004 |
| KR | 200367260 | 11/2004 |
| WO | 2010131108 A2 | 11/2010 |
| WO | 2015126405 A1 | 8/2015 |
| WO | 2016022843 A1 | 2/2016 |

OTHER PUBLICATIONS

Hedderman, R, An Interview with Dr. Kevin Laudner & A Tour of Illinois State University: Go Red Birds, Jul. 15, 2015, at least pp. 17-18, http://www.hurricanefitnessireland.com/blog/2015/7/7/an-interview-with-dr-kevin-laudner-at-illinois-state-university-go-red-birds, (retrieved on Sep. 20, 2016).

KIPO, International Search Report for PCT/US2016/0192239, dated Sep. 23, 2016.

KIPO,Written Opinion of the International Searching Authority for PCT/US2016/0192239, dated Sep. 23, 2016.

Osborn, Karrie, Tape It Up, Massage and Bodywork Magazine for the Visually Impaired, May/Jun. 2009 Article list.

Tool Assisted Massage, More 1-day Courses Announced, Feb. 26, 2014, http://toolassistedmassage.co.uk/more-1-day-courses-announced/, downloaded on Feb. 9, 2015.

Van Den Dries, et al., Massage Tool, Unpublished Design U.S. Appl. No. 29/552,048, filed Jan. 20, 2016.

Van Den Dries, et al., Massage Tool, Unpublished Design U.S. Appl. No. 29/552,049, filed Jan. 20, 2016.

Van den Dries, European Union Intellectual Property Office Certificate of Registration for Registered Community Design No. 002979104-0002, published Feb. 9, 2016.

Van den Dries, European Union Intellectual Property Office Certificate of Registration for Registered Community Design No. 002979104-0001, published Feb. 9, 2016.

Van Den Dries, Greg, Unpublished U.S. Appl. No. 15/271,027, filed Sep. 20, 2016.

European Patent Office, International Search Report for PCT/US2017/060598, dated Feb. 5, 2018.

European Patent Office, Written Opinion of the International Searching Authority for PCT/US2017/060598, dated Feb. 5, 2018.

EPO, Extended Search Report for related EPO Applicatoin 16846980.7, dated Jul. 13, 2018.

European Patent Office, Supplemental Partial Search Report and Provisional Opinion for related European Patent Application EP16846980, dated Mar. 23, 2018.

Chinese Intellectual Property Office, Office Action in related case CN201680021561.7, dated May 24, 2019.

* cited by examiner

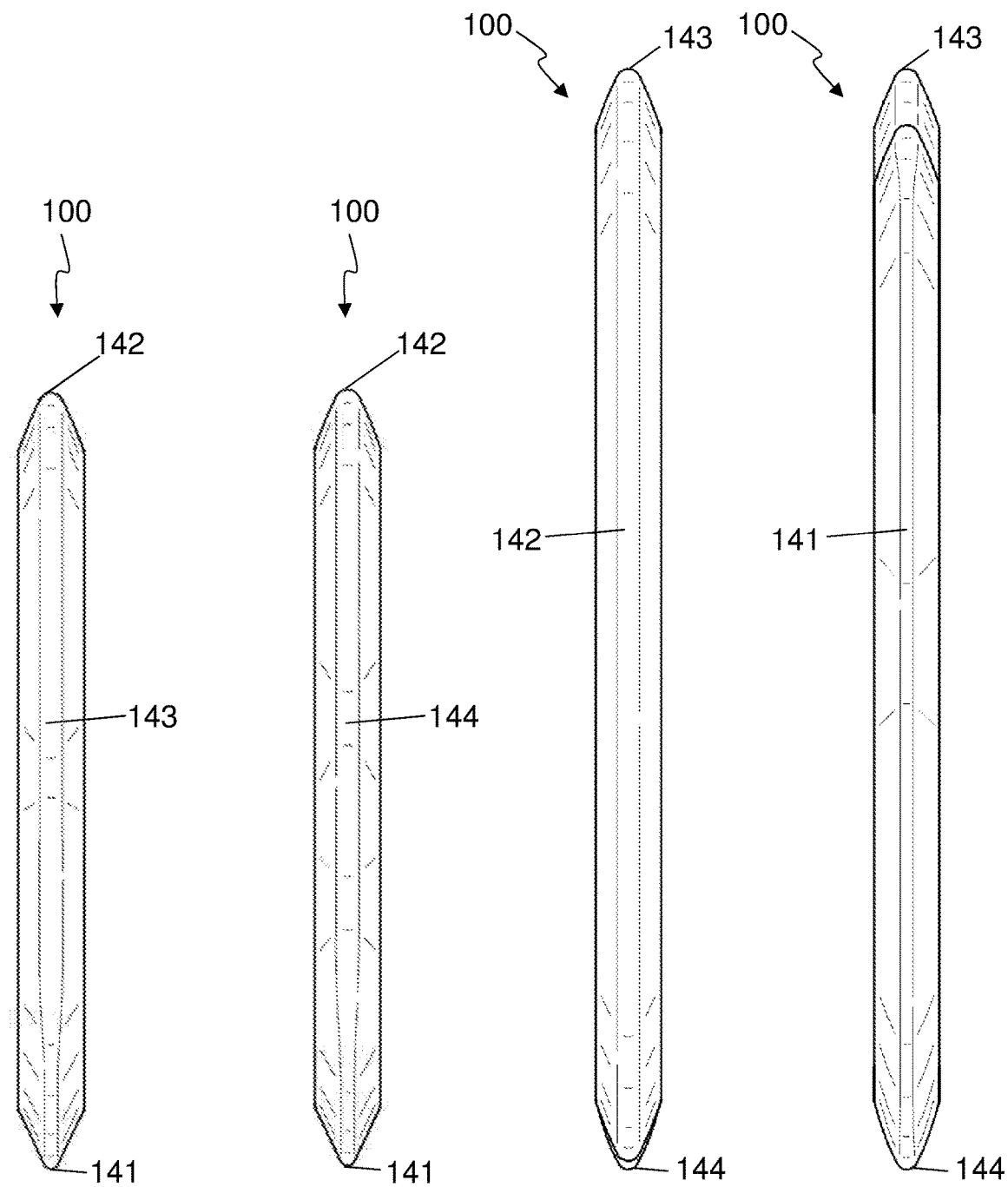

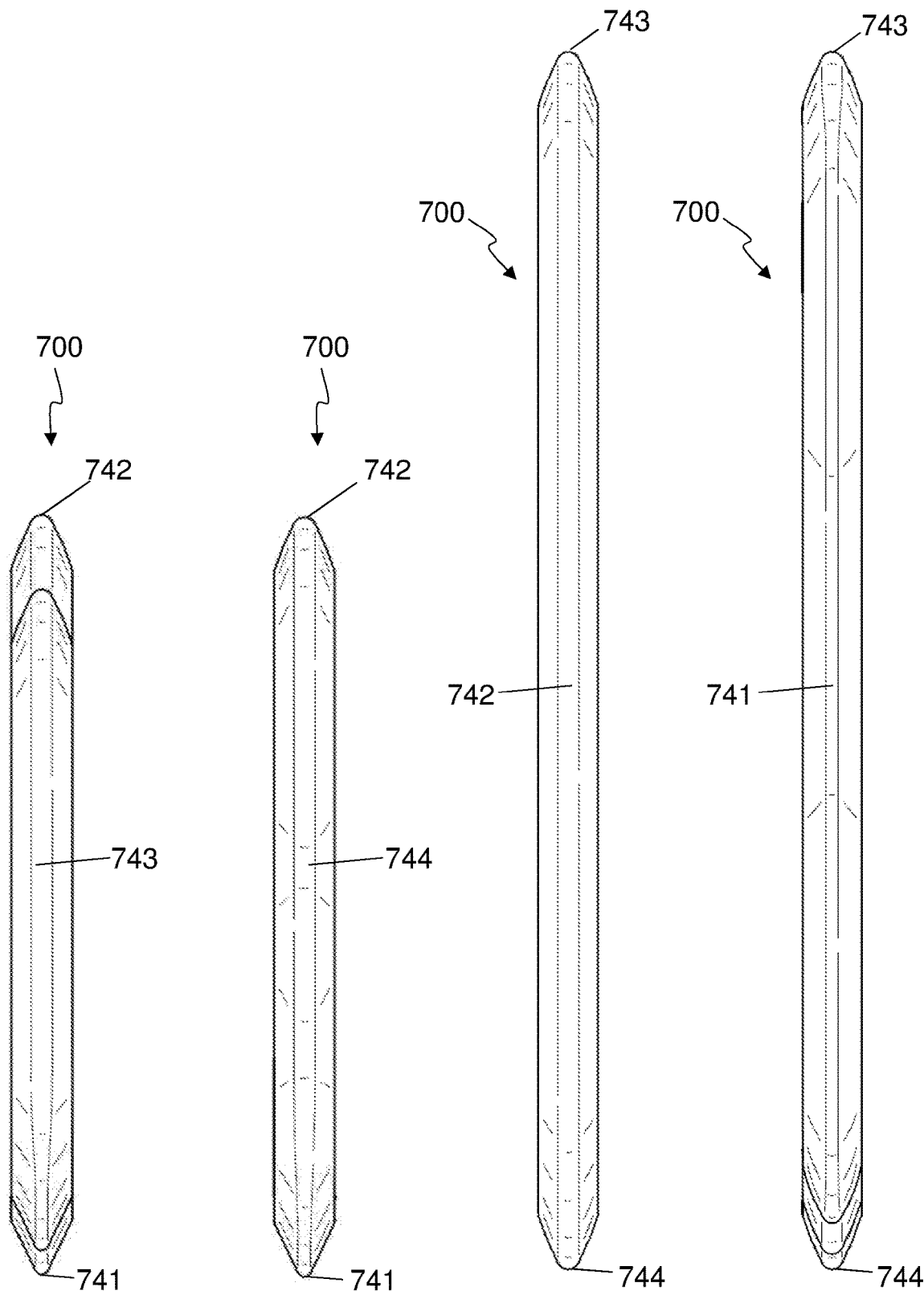

MULTI-LAYERED MASSAGE TOOL

BACKGROUND

Technical Field

The present subject matter relates to a massage tool, and more particularly, a hand-held manual massage tool made with multiple layers of material.

Background Discussion

Massage has long been used as a relaxation technique as well as a form of therapy for fatigue and many different musculoskeletal disorders. Massage involves manipulation of a person's body, and often targets one or more specific muscles and/or joints on the body, depending on the objective of the massage. Targeted tissues for various types of massage include muscles, tendons, ligaments, fascia, skin, lymphatic vessels, and organs of the gastrointestinal system. Many different techniques are used for massage, including static pressure, moving pressure, and vibration.

Different massage techniques are applied using various apparatus. In many types of massage, the massage therapist uses a part of their body to apply the massage, such as hands, fingers, elbows, knees, forearms, or feet. In some types of massage, the individual receiving the massage is positioned on an apparatus that positions the individual for the masseuse, or can even apply the massage directly to the individual. The apparatus can vary widely and range from a small object, such as a ball or block, that the individual lies, sits or stands on, to large complex massage machines, such as a massage chair, that hold the individual and mechanically perform the massage on the individual.

In some forms of massage, such as myofascial release, fascial tissue manipulation, Gua sha, and the Graston Technique®, just to name a few, hand-held massage tools are commonly used. In many types of massage, the massage tools are used to stretch the fascia and release bonds between fascia, integument, and muscles, with a goal of eliminating pain and/or increasing a range of motion. The tools can be used to apply shear compression or tension in various directions, to roll over the skin, or for many other effects, depending on the type of massage and the specific objectives.

BRIEF DESCRIPTION OF THE DRAWINGS

The accompanying drawings, which are incorporated in and constitute part of the specification, illustrate various embodiments. Together with the general description, the drawings serve to explain various principles. In the drawings:

FIG. 1C shows a rear elevation view of the first embodiment of a multi-layered massage tool;

FIG. 1D shows a front elevation view of the first embodiment of a multi-layered massage tool;

FIG. 1E shows a top plan view of the first embodiment of a multi-layered massage tool;

FIG. 1F shows a bottom plan view of the first embodiment of a multi-layered massage tool;

FIG. 7C shows a rear elevation view of the second embodiment of a multi-layered massage tool;

FIG. 7D shows a front elevation view of the second embodiment of a multi-layered massage tool;

FIG. 7E shows a top plan view of the second embodiment of a multi-layered massage tool;

FIG. 7F shows a bottom plan view of the second embodiment of a multi-layered massage tool;

DETAILED DESCRIPTION

Figure 1A:
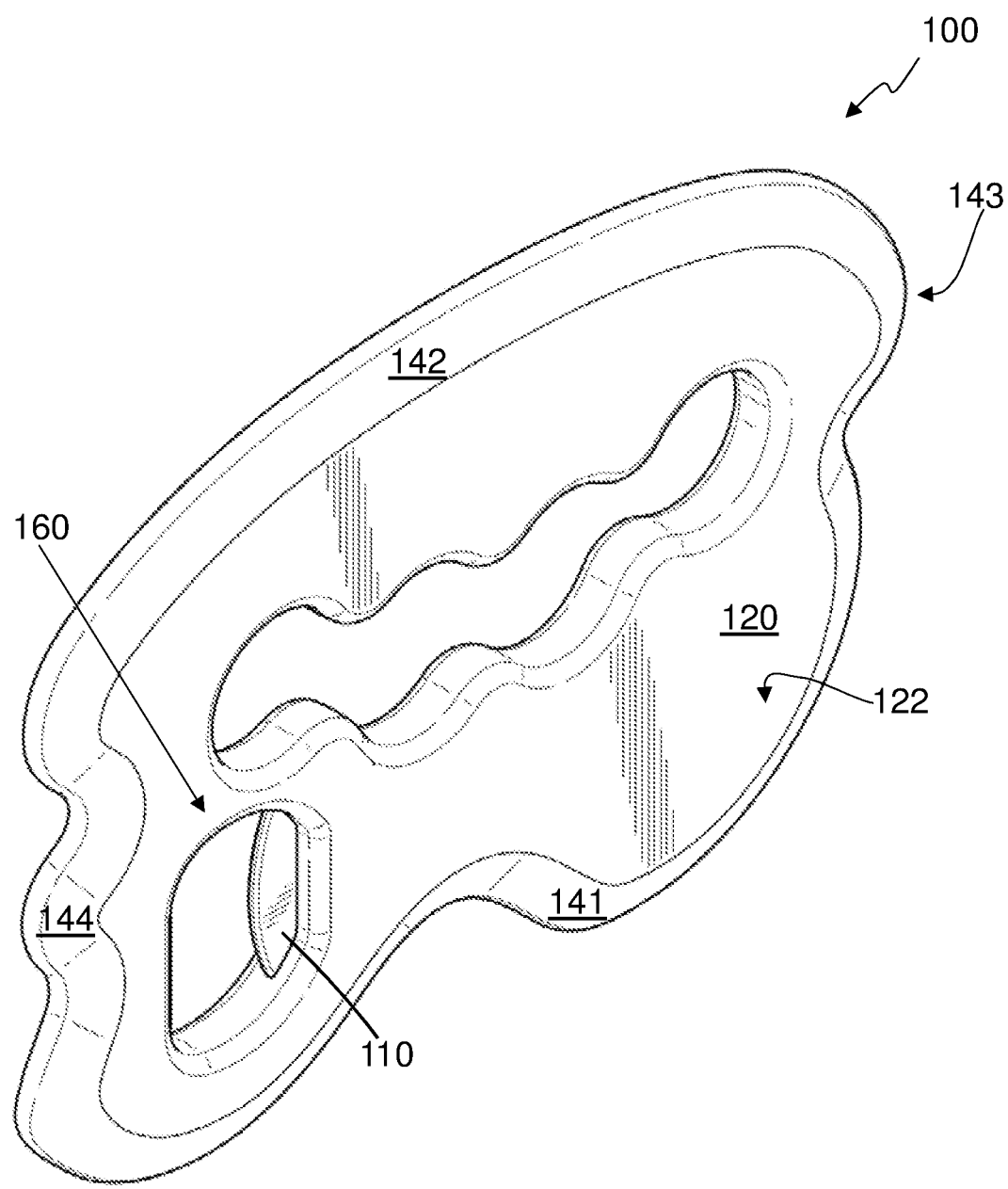
FIG. 1A is a front, right and top perspective view of a first embodiment of a multi-layered massage tool.

In the following detailed description, numerous specific details are set forth by way of examples in order to provide a thorough understanding. However, it should be apparent to those skilled in the art that the some embodiments may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Different sizes, shapes, and masses of massage tools are best suited for different massage techniques and for the comfort and preference of the massage therapist and subject. The multi-layered massage tool can be of any thickness, length and height suitable to be held in one or two hands, depending on the embodiment. In at least some embodiments, the multi-layered massage tool has first and second sides that are both substantially flat and parallel to each other, and the massage tool has a thickness between about 5 millimeters (mm) and about 50 mm, with many embodiments having a thickness between about 7 mm and about 15 mm. In some embodiments, the multi-layered massage tool has a length and height that are each between about 30 mm and about 500 mm, with many embodiments having a length and height that are each between about 125 mm and about 200 mm. Different materials used in the construction of a multi-layered massage tool can also provide different therapeutic effects due to such variables as coefficient of friction and heat capacity. In general, a stiff massage tool is desirable, but some materials, such as plastic may not be very stiff in the desired massage tool form, so a weight plate may be included in the multi-layered massage tool that is stiffer than a first outer layer and a second outer layer of the massage tool. In other cases, the mass of a massage tool may need to be increased or decreased from the mass that would result from simply forming the massage tool from the desired material, so a weight plate may be included to tune the mass to a desired value. Various embodiments of the multi-layered massage tool have various masses depending on their size and intended purpose, but may have a total mass of between about 50 grams (g) and 2000 g with many multi-layered massage tools having a mass of between about 150 g and about 550 g.

By fabricating a massage tool from multiple layers of material, the size, mass, and stiffness, can all be controlled while still providing the desired shape of the massage tool with the massage surface composed of the desired material. An inner layer can be provided which is referred to herein as a weight plate, to provide additional mass and/or stiffness to the massage tool. In some embodiments, the weight plate is made from steel and has a mass of between about 30 g and 300 g. Some embodiments of the multi-layered massage tool use a single weight plate, while others may use multiple weight plates.

Any type of material can be used for the various layers of the multi-layered massage tool, including, but not limited to, various alloys of steel, other metals or alloys of metals, wood, ceramic materials including glass, composite materials such as carbon fiber composites, fiberglass, or concrete, or any type of plastic, such as acrylonitrile butadiene styrene (ABS), polycarbonate (PC), polybutylene terephthalate (PBT), polyoxymethylene (POM), nylon, polyvinyl chloride (PVC), or combinations thereof, to name a few. The various layers can be joined together by any method suitable for the configuration and the materials, including gluing, molding, welding, soldering, riveting, bolting, and snapping.

Some embodiments of the massage tool provide multiple different surfaces adapted to massage different portions of the human body. The different surfaces can be have a convex, straight, or concave contour and can have any type of cross-sectional shape, including rounded, or tapered with a radiused rim. Some massage surfaces may be adapted to a particular portion of the human body, such as the calf muscle or back, and some massage surfaces may be shaped to allow localized pressure to be applied to a human body. Some embodiments of the massage tool are substantially flat and may include features to allow the massage tool to be securely held by hand, such as textured surfaces, depressions in the sides, or holes to allow one or more fingers to extend through the massage tool.

Some embodiments also incorporate a bottle opener. The bottle opener can be used to open a standard beverage bottle with a crimped-on bottle cap, such as a glass soda pop bottle or glass beer bottle.

Reference now is made in detail to the examples illustrated in the accompanying drawings and discussed below.

Figure 1B:
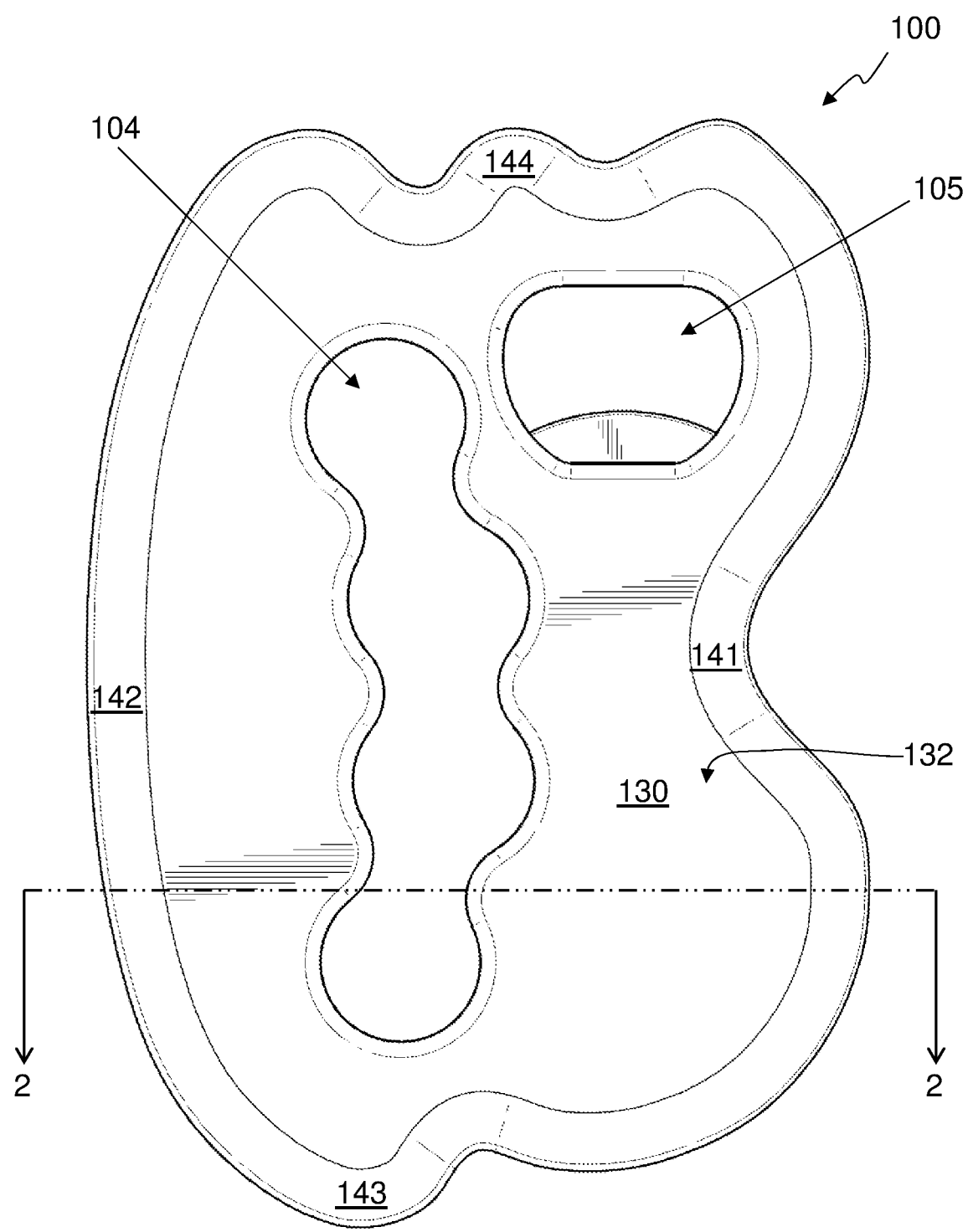
FIG. 1B shows a left side elevation view of the first embodiment of a multi-layered massage tool.
Figure 2:
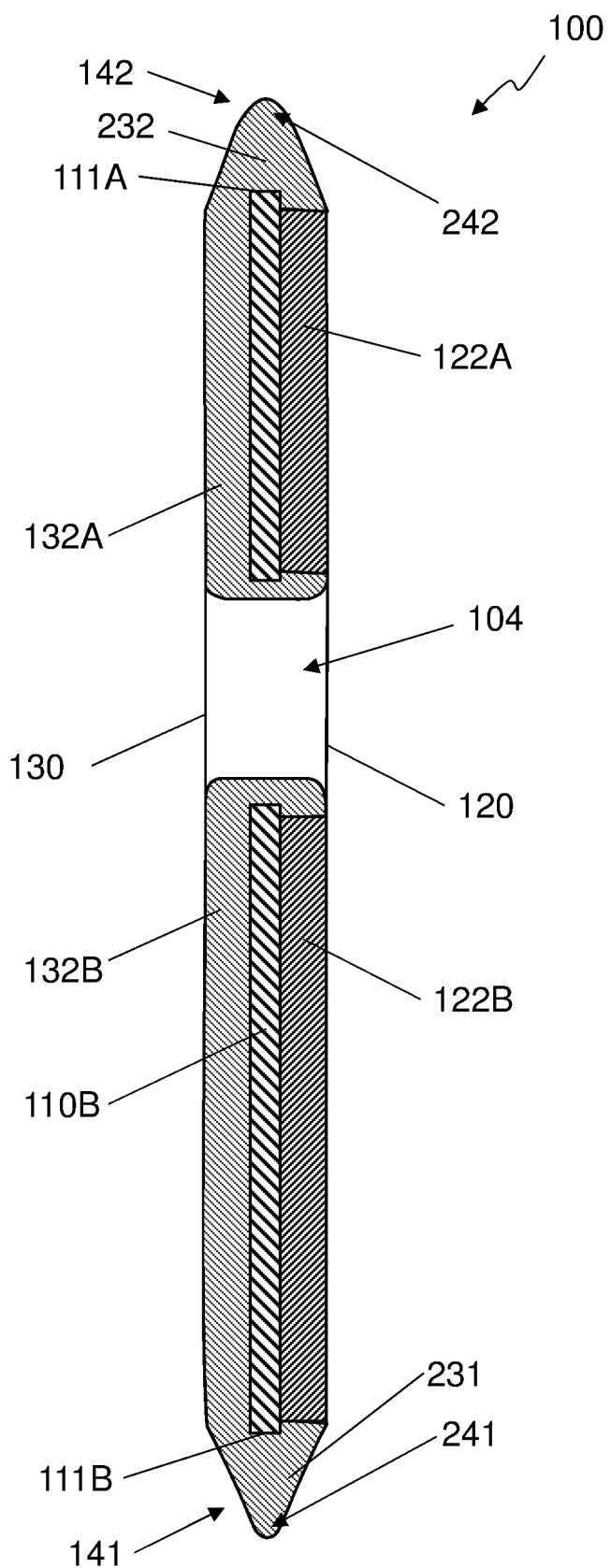
FIG. 2 shows a cross-sectional view of the first embodiment of a multi-layered massage tool.
Figure 3:
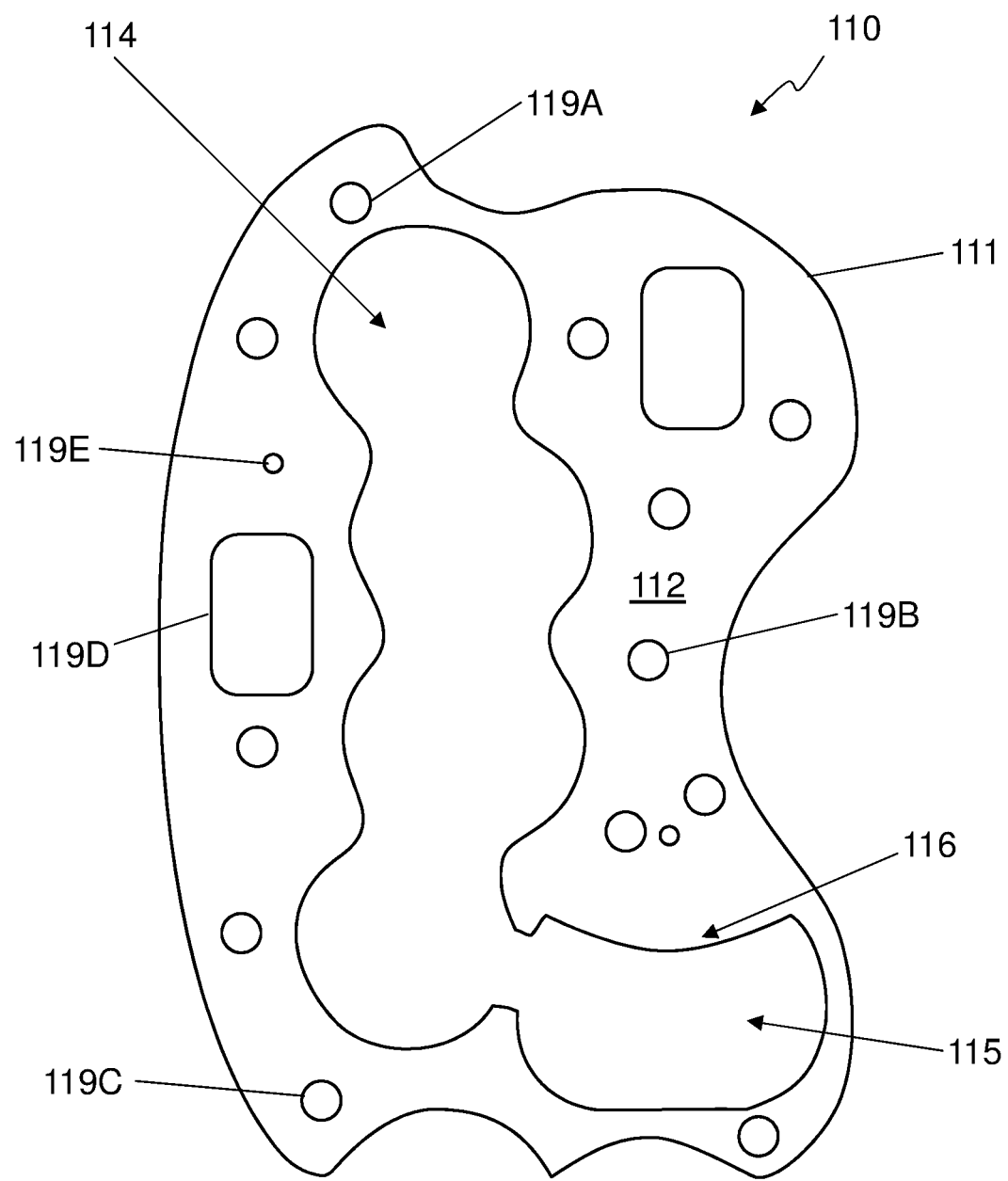
FIG. 3 shows an embodiment of a weight plate suitable for use in fabrication of the first embodiment of the multi-layered massage tool.

FIG. 1A-F and FIG. 2 show different views of a first embodiment of a multi-layered massage tool 100 with an integrated bottle opener 160, and FIG. 3 shows a weight plate 110 used in the first embodiment of the multi-layered massage tool 100. FIG. 1A is a front, right and top perspective view of a first embodiment of a multi-layered massage tool 100 and FIG. 1B shows a left side elevation view of the first embodiment of a multi-layered massage tool. FIGS. 1C, 1D, 1E, and 1F show a rear elevation view, a front elevation view, a top plan view, and a bottom plan view of the first embodiment of a multi-layered massage tool, respectively. FIG. 2 shows a cross-sectional view of the first embodiment of a multi-layered massage tool 100. The following discussion applies equally to FIG. 1A-F, FIG. 2, and FIG. 3, with various parts of the massage tool 100 shown more clearly in some views than in other views. While common reference numbers are used for these drawings, not every feature is labeled with the reference number in every drawing in which it is visible to help enhance the clarity of the drawings.

The multi-layered massage tool 100 has a weight plate 110 having a first side, a second side 112 opposite from the first side, and an outer edge 111, a first outer layer 132 disposed on the first side of the weight plate 110 to form a first side 130 of the massage tool 100, a second outer layer 122 disposed on the second side 112 of the weight plate 110 to form a second side 120 of the massage tool 100, and one or more massage surfaces 141-144 coupling the first side 130 of the massage tool 100 to the second side 120 of the massage tool 100 and covering at least a portion of the outer edge 111 of the weight plate 110. Any type of material can be used for the various layers 110, 122, 132 of the multi-layered massage tool 100, including, but not limited to any type of plastic, various alloys of steel, other metals or alloys of metals, wood, ceramic materials, and composite materials. In the first embodiment of the multi-layered massage tool 100, the first outer layer 132 and the massage surface 141-144 are included in a first plastic part and the second outer layer 122 is included in a second plastic part, where both the first plastic part and the second plastic part may be fabricated from an alloy blend of polybutylene terephthalate and polycarbonate (PBT+PC) plastic to provide good chemical resistance and excellent impact resistance. The weight plate 110 of the first embodiment is fabricated from stainless steel about 1.5 mm thick and has a mass of between 45 grams (g) and 60 g, to provide a total mass of between 180 g and 195 g for the multi-layered massage tool 100.

In the first embodiment, the first side 130 and the second side 120 of the massage tool 100 are substantially flat, although other embodiments may have sides that are convex, concave, or have a more complex shape. The first embodiment of the multi-layered massage tool 100 has a thickness of about 9 mm, a length of about 150 mm, and a height of about 106 mm. The first embodiment of the multi-layered massage tool 100 includes a finger hole 104 through the first outer layer 132, the weight plate 110, and the second outer layer 122. The finger hole 104 is sized to allow one or more fingers to extend through the massage tool 100. The first embodiment of the multi-layered massage tool 100 also includes a bottle opener 160 that includes an opening 105 through the first outer layer and the second outer layer, and a portion of the weight plate 110 protruding into the opening 104 and adapted to catch an edge of a bottle cap.

In the first embodiment of the multi-layered massage tool 100, the massage surface 141-144 extends around the massage tool 100 so that the outer edge 111 of the weight plate 110 is entirely covered by the massage surface 141-144. In other embodiments, the massage surface may not entirely cover the outer edge of the weight plate with the covered portion of the outer edge being as little as about one quarter, or 90 degrees. In embodiments, the massage surface may be is divided into any number of sections that may be continuous or have discontinuities between sections. The massage surface 141-144 of the massage tool 100 has a bottom massage surface 141 with a concave contour and a top massage surface 142 with a convex contour, where the contour is the curve created by a silhouette of that portion of the massage surface as viewed from the side. The massage tool 100 also has rear massage surface and a front massage surface 144 with complex contours having subsections with concave and portions with convex contours.

Referring now primarily to FIG. 2, which is a cross-sectional view, the three layers of the first embodiment of a multi-layered massage tool 100 can be seen. The location at which the cross-sectional view of FIG. 2 is taken is shown by the cross-section line 2:2 in FIG. 1B. Two portions of the weight plate 110 are shown in the cross-sectional view of FIG. 2, a first portion 110A and a portion 110A on opposite sides of the finger hole 104, with respective outer edges 111A and 111B. Two portions of the first outer layer 132 are also shown, a first portion 132A and a second portion 132B, on opposite sides of the finger hole 104. The first outer layer 132 is disposed on a first side of the weight plate 110 to form a first side 130 of the massage tool. Two portions of the second outer layer 122 are also shown, a first portion 122A and a second portion 122B, on opposite sides of the finger hole 104. The second outer layer 122 is disposed on a second side of the weight plate 110 to form a second side 120 of the massage tool. In the embodiment shown, the first outer layer 132 also forms a first massage surface 141 and a second massage surface 142 that couple the first side 130 of the massage tool 100 to the second side 120 of the massage tool 100 and covering at least a portion of the outer edge 111 of the weight plate 110.

The multi-layered massage tool 100 includes a first section 141 of the massage surface and a second section 142 of the massage surface. The first section 141 includes a first tapered portion 231 coupling the first 130 and second 120 sides of the massage tool 100 to a first rim section 241 having a first cross sectional radius, and the second section 142 includes a second tapered portion 232 coupling the first 130 and second 120 sides of the massage tool 100 to a second rim section 242 having a second cross sectional radius. The first radius of the first rim section 241 of the first section 141 of the massage tool 100 is less than the second radius of the second rim section 242 of the second section 142 of the massage tool 100, and the second radius of the second rim section 242 of the second section 142 of the massage tool 100 is less than one half of a distance from the first side 130 to the second side 120 of the massage tool 100, or less than one half of the thickness of the massage tool 100. This gives the first massage surface 141 a sharper edge, or rim, than the second massage surface 142. Various radius dimensions can be used, depending on the embodiment, with some embodiments having the same radius for all edges, some having different sections with two different radii as shown herein, and some having more than two different sections with more than two different radii. Some embodiments use a first radius of between about 0.5 mm and about 3 mm and a second radius of between about 1 mm and about 4 mm. In at least one embodiment, the first radius is about 1.0 mm and the second radius is about 1.75 mm.

Referring now primarily to FIG. 3, an embodiment of a weight plate 110 suitable for use in fabrication of the first embodiment of the multi-layered massage tool 100 is shown. The weight plate 110 has a first side (not visible in FIG. 3) and a second side 112 opposite from the first side. The weight plate 110 also includes an outer edge 111 extending around the outer perimeter of the weight plate 110. Some embodiments may include small protrusions at intervals around the edge 110 to allow better attachment to the first outer layer 132 if molded into a plastic part. The weight plate 110 includes a finger hole 114 that will be coincident with the finger hole 104 of the manufactured massage tool 100 and a bottle opener hole 115 that will be coincident with a part of the opening 105 of the finished massage tool 100. In some embodiments, the hole 114 and the hole 115 may be completely separate, but in the embodiment shown, there is an open area between the hole 115 and the hole 114. The weight plate 110 may also include a plurality of other holes 119A-E through the weight plate 100. The other holes 119A-E can be of any shape or size, including round, such as holes 119A-C, 119E, or rectangular with rounded corners, such as hole 119D and can be used for any purpose including mass reduction, plastic part retention, holes through the massage tool, or any other purpose.

The weight plate 110 can be created from any type of material using any suitable method. In some embodiments, the weight plate 110 is created by stamping the weight plate 110 from steel to form the shape of the outer edge 111 and create a plurality of holes 114, 115, 119A-E in the weight plate 110. In other embodiments, the weight plate 110 is created by cutting the weight plate 110 from steel using a laser or a waterjet to form the shape of the outer edge 111 and create a plurality of holes 114, 115, 119A-E in the weight plate 110.

Figure 4:
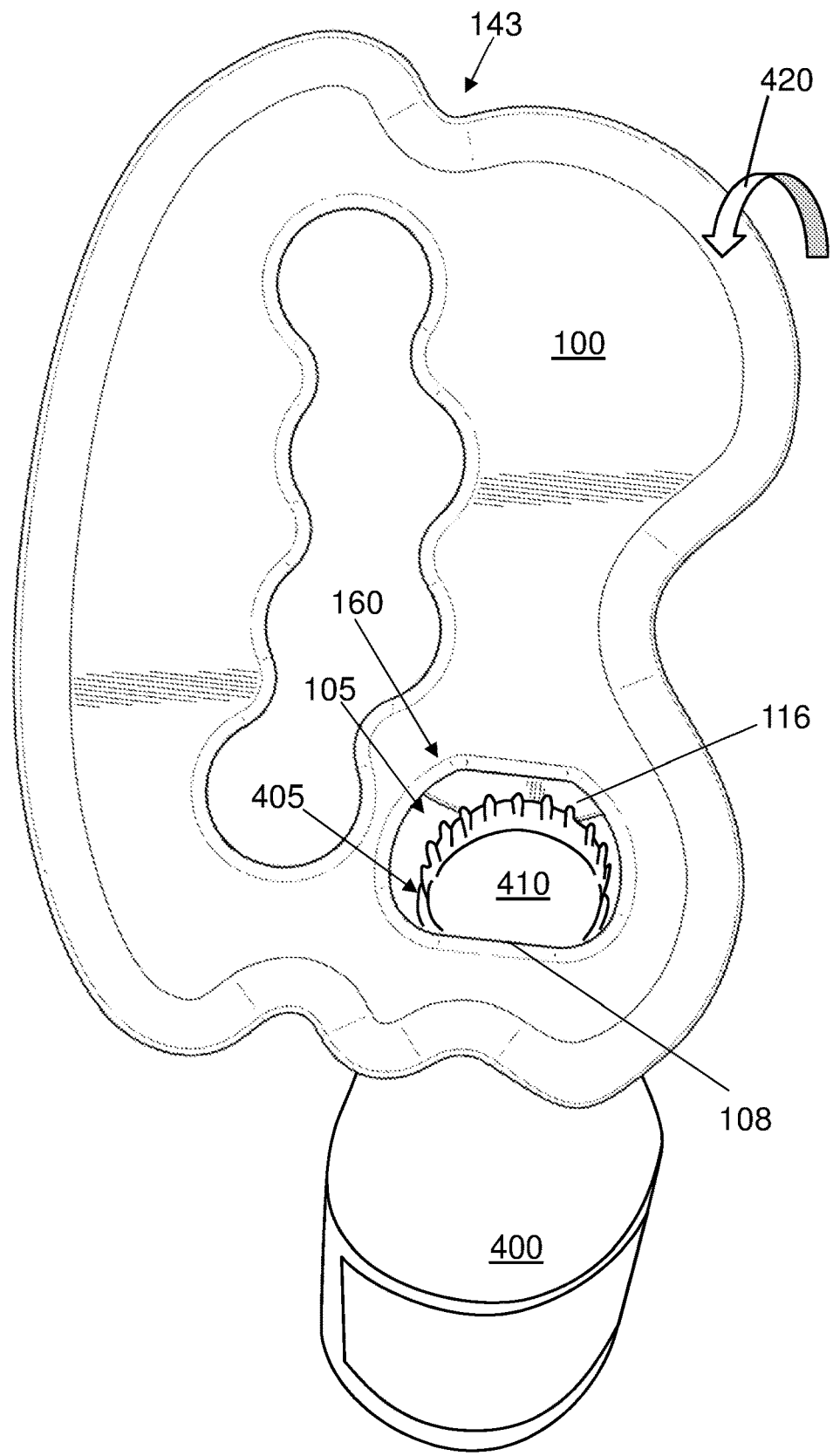
FIG. 4 shows the first embodiment of the multi-layered massage tool opening a bottle using an integrated bottle opener.

FIG. 4 shows the massage tool 100 opening a bottle 400 using an integrated bottle opener 160 of the massage tool 100. The massage tool 100 includes a bottle opener 160. The bottle opener 160 can be formed using various features of the massage tool 100 that are used for other purposes or included specifically for the bottle opener 160, depending on the embodiment. The bottle opener 160 of the first embodiment of the multi-layered massage tool 100 is formed by including a protrusion 116, which is a portion of the weight plate 110, on the inside of the opening 105 through the massage tool 100. The protrusion 116 inside the opening 105 is adapted to catch an edge of a bottle cap 410 that is crimped on the lip 405 of the bottle. The opening 105 is sized to allow one side of the bottle cap 410 to engage with the protrusion 116 while the other side of the bottle cap 410 supports an edge 108 of the opening 105.

In some embodiments, the bottle opener includes an opening 105 through the first outer layer 132 and the second outer layer 122, a hole 115 through the weight plate 110, at least a part of the hole 115 coincident with a part of the opening 105, and a portion 116 of the weight plate 110 protruding into the opening 105 adapted to catch an edge of a bottle cap 410. The opening 105 and the hole 115 are adapted to allow an one side of the bottle cap 410 to engage with the protrusion 116 while the other side of the bottle cap 410 supports an edge 108 of the opening 105 to allow the massage tool 100 to pry off the bottle cap 410 of a bottle 400. The prying action is provided by rotating the rear of the massage tool 100 up 420 by applying force to the massage tool 100.

Figure 5A:
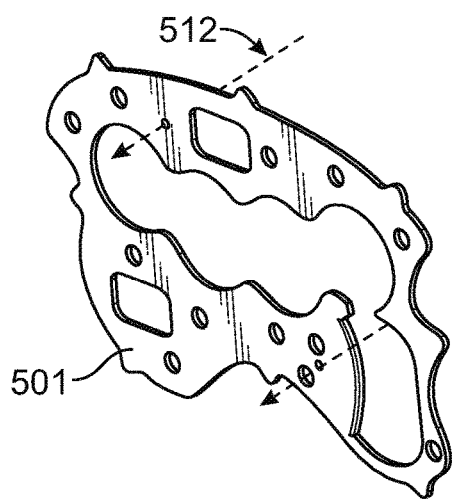
FIG. 5A-D show partially fabricated versions of an embodiment of the multi-layered massage tool.
Figure 5B:
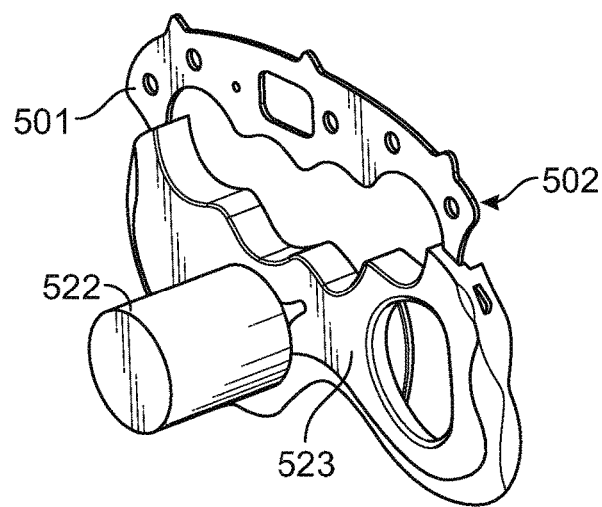

FIG. 5A-D show partially fabricated versions of an embodiment of the multi-layered massage tool. FIG. 5A shows a weight plate 501 being inserted 502 into a first mold, which is not shown for clarity. The first mold holds the weight plate 501 in position to allow plastic that is injected or otherwise placed into the first mold to be molded to the weight plate 501. FIG. 5B shows the first mold being injected with plastic resin. An injector 522, or other mechanism used to put plastic resin into the first mold, injects plastic 523 into the first mold which molds a first plastic part that is bonded to the weight plate 501, creating a first subassembly. The first plastic part forms a first outer layer of the multi-layered massage tool. The first outer layer is disposed on the first side of the weight plate. In the embodiment shown, the first plastic part also forms a massage surface covering the outer edge 502 of the weight plate 501.

Figure 5C:
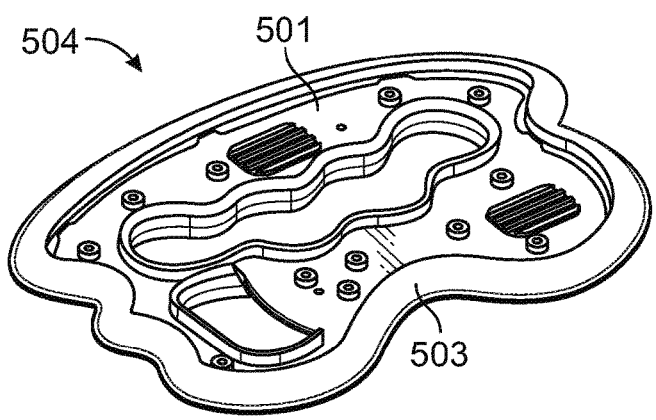
Figure 5D:
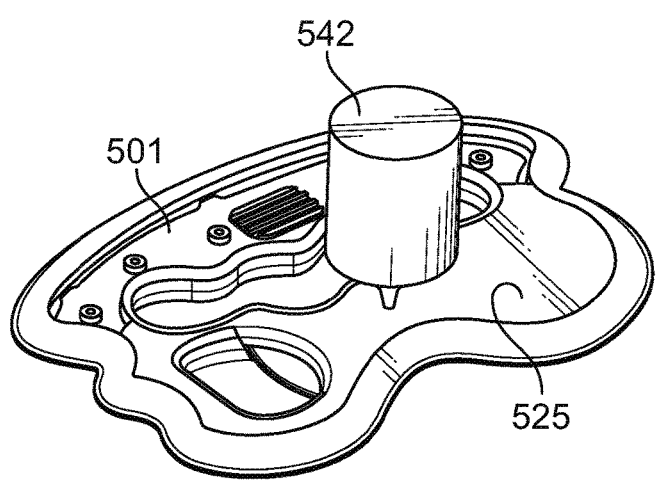

FIG. 5C shows a first subassembly 504 which includes the weight plate 501 and the first plastic part 503 to be used in a multi-layered massage tool. The first subassembly 504 is inserted into a second mold (not shown). FIG. 5D shows the first subassembly 504 in the second mold. An injector 542 is used to fill the second mold with plastic 525 which molds a second plastic part to create a second outer layer disposed on the second side of the weight plate 501. The second plastic part is molded to the weight plate 501 and the first plastic part 503 to create a multi-layered massage tool.

Figure 6:
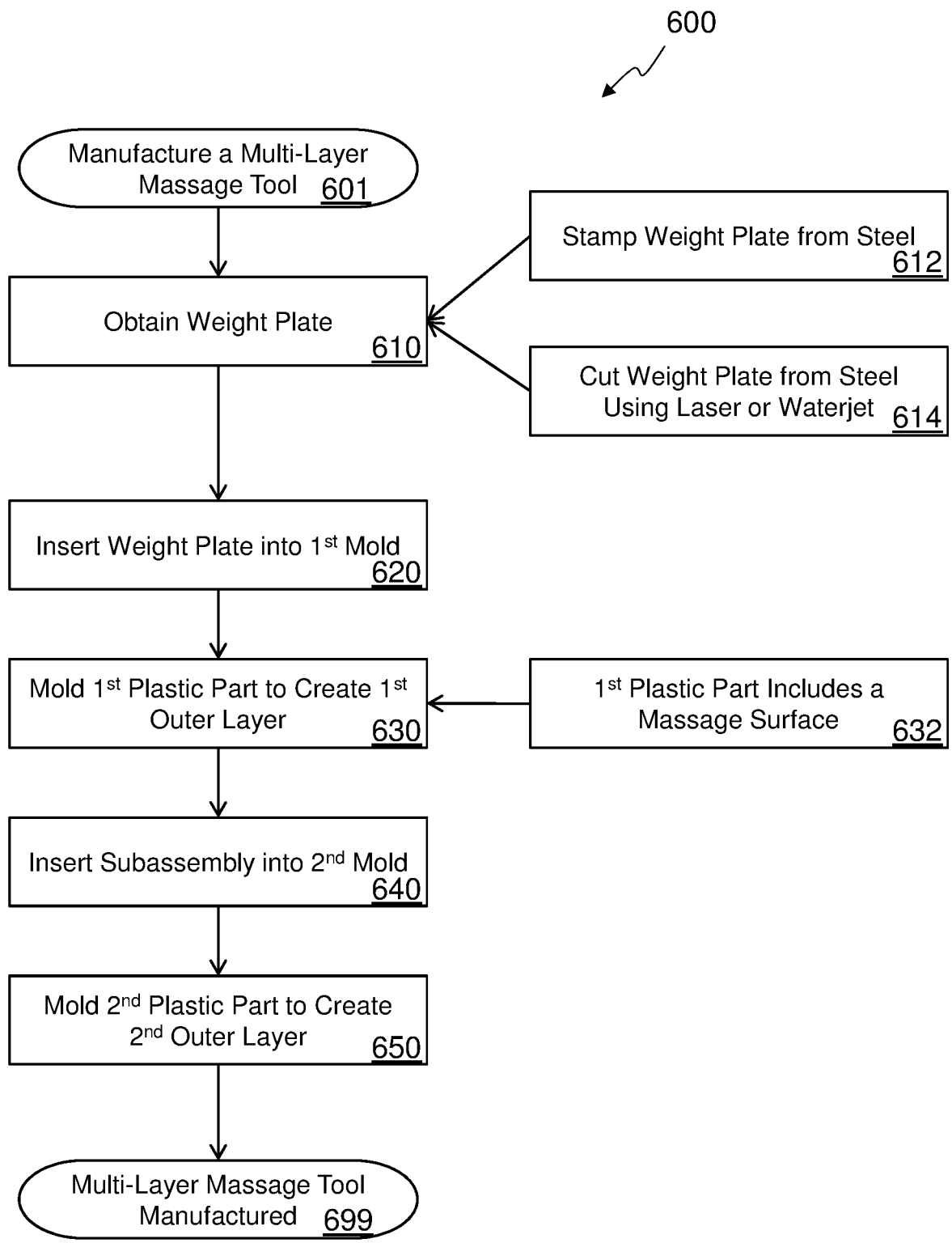
FIG. 6 shows a flow chart of a first embodiment of a method to manufacture a multi-layered massage tool.

FIG. 6 shows a flow chart 600 of a first embodiment of a method to manufacture a multi-layered massage tool. The method of manufacturing a multi-layered massage tool starts at block 601 and continues by obtaining 610 a weight plate having a first side, a second side opposite from the first side, and an outer edge. In some embodiments, the obtaining is accomplished by stamping 612 the weight plate from steel to form the shape of the outer edge and create a plurality of holes in the weight plate. In other embodiments, the obtaining is accomplished by cutting 614 the weight plate from steel using a laser or a waterjet to form the shape of the outer edge and create a plurality of holes in the weight plate. In some embodiments, the obtaining is accomplished by purchasing a fabricated weight plate from a supplier. Other techniques may also be used to obtain the weight plate for other embodiments. The method continues with inserting 620 the weight plate into a first mold, and molding 630 a first plastic part using the first mold to create a first outer layer disposed on the first side of the weight plate. In some embodiments, the first plastic part also includes 632 a massage surface covering the outer edge of the weight plate. This also creates a first subassembly that includes the first plastic part and the weight plate. The first subassembly is then inserted 640 into a second mold, and a second plastic part is molded 650 using the second mold to create a second outer layer disposed on the second side of the weight plate. The multi-layered massage tool also includes the second plastic part. The multilayered massage tool is manufactured at block 699.

Figure 7A:
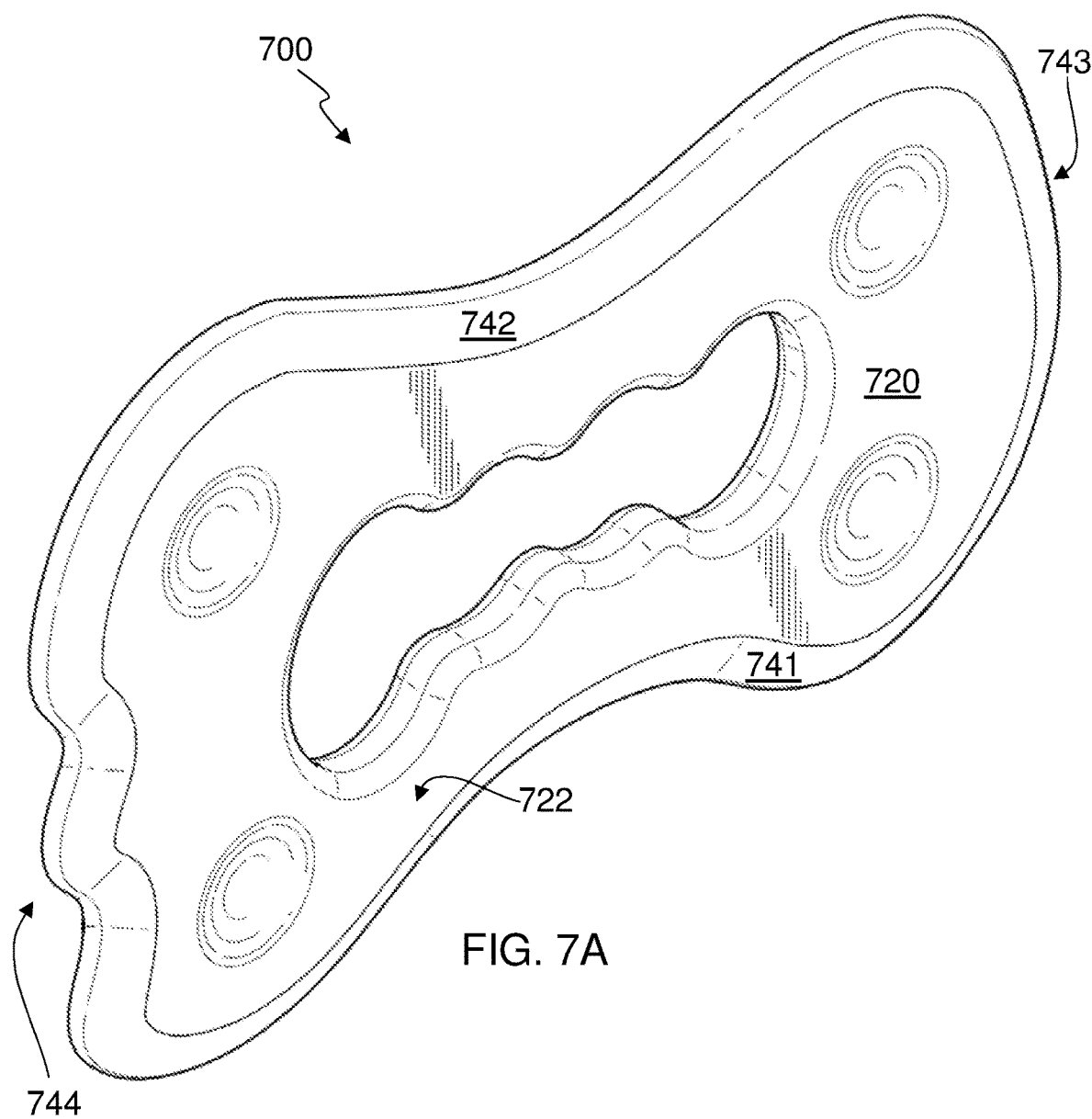
FIG. 7A is a front, right and top perspective view of a second embodiment of a multi-layered massage tool.
Figure 7B:
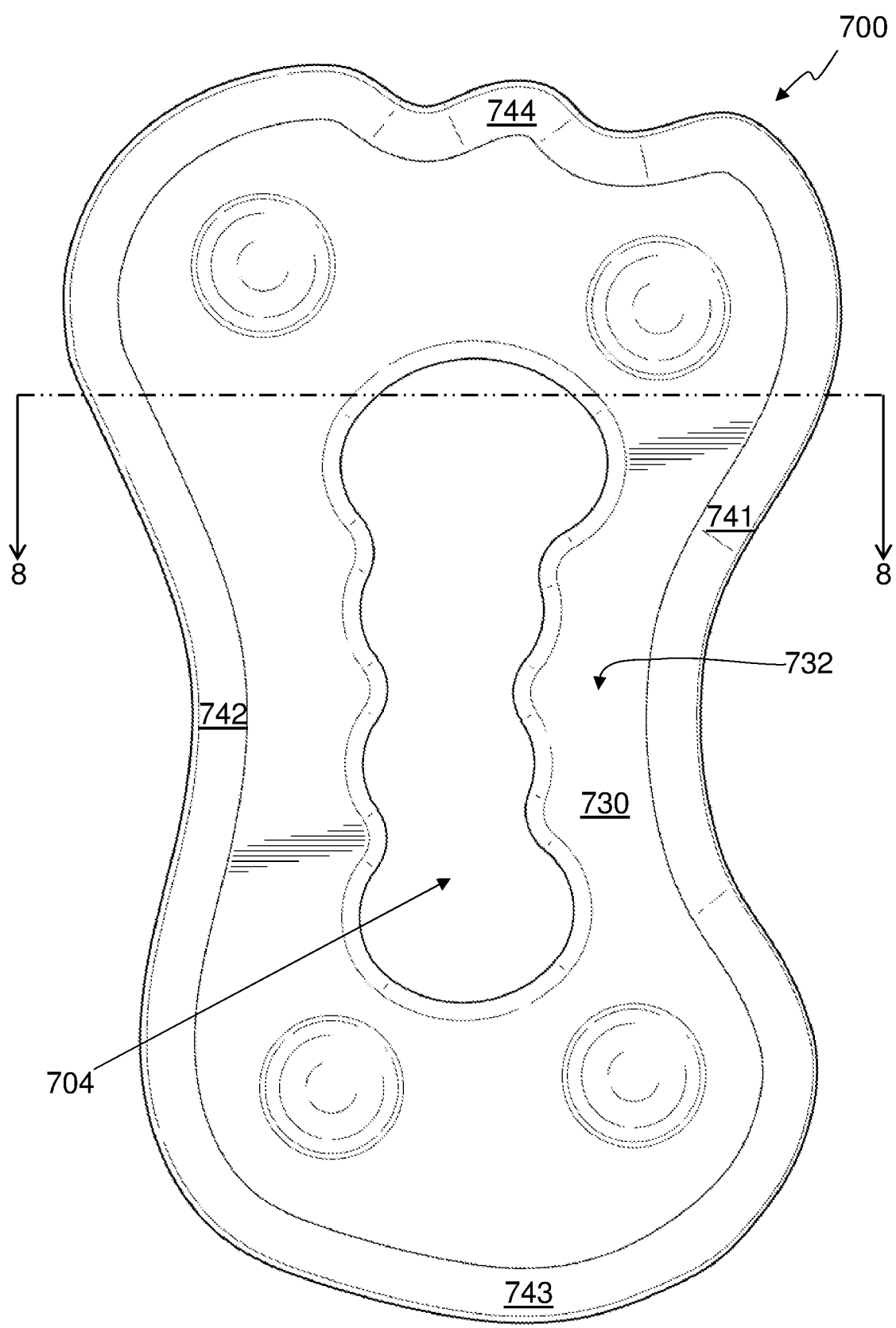
FIG. 7B shows a left side elevation view of the second embodiment of a multi-layered massage tool.
Figure 8:
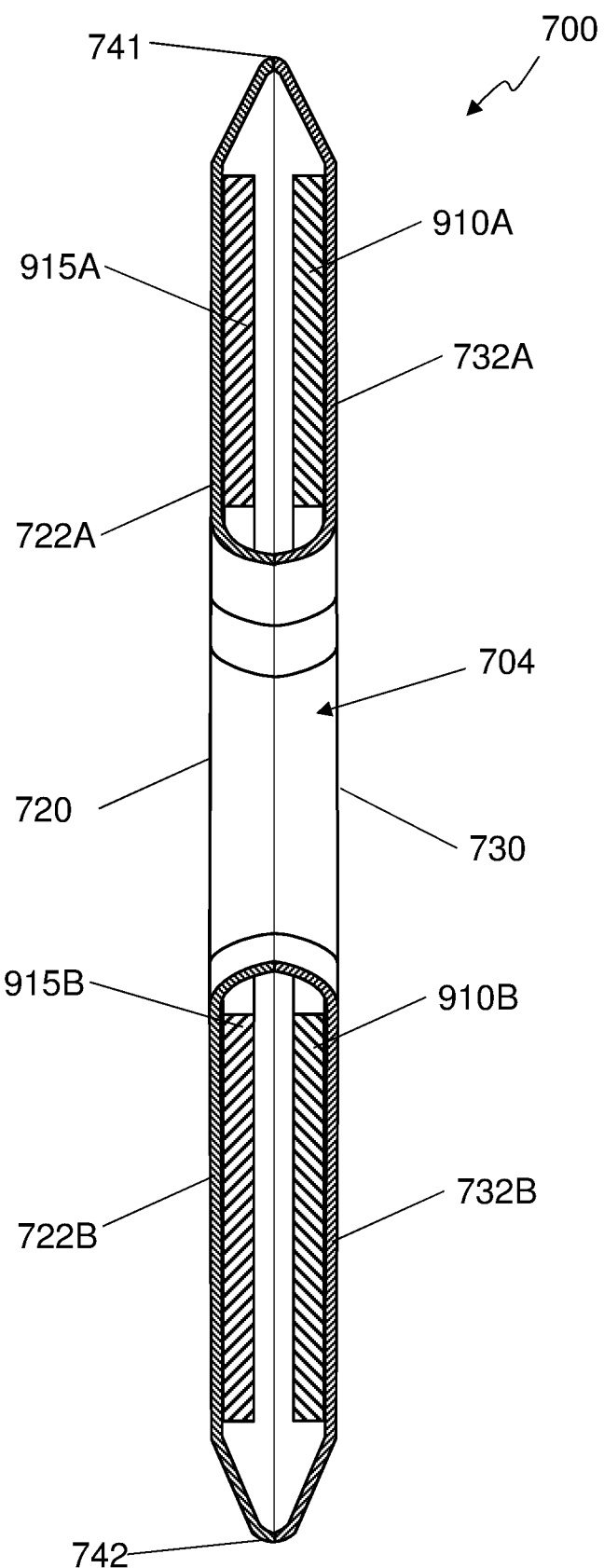
FIG. 8 shows a cross-sectional view of the second embodiment of a multi-layered massage tool.
Figure 9:
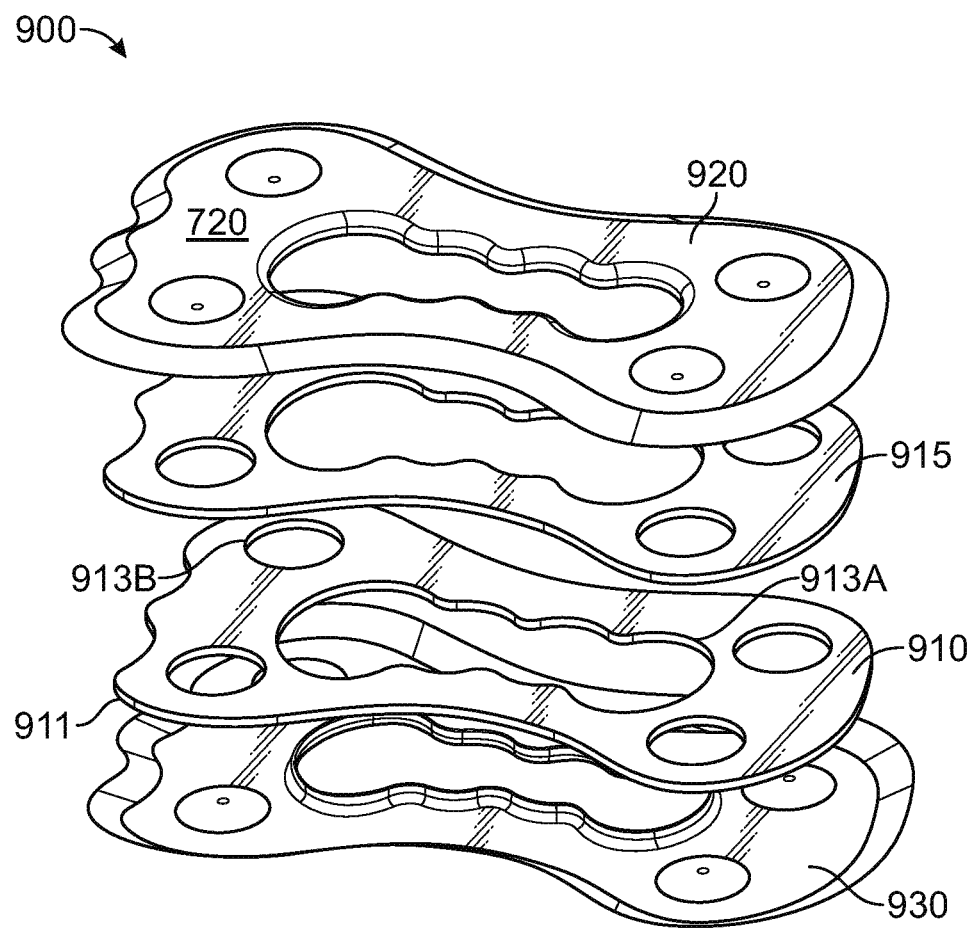
FIG. 9 shows an exploded view of a set of parts of the second embodiment of a multi-layered massage tool.

FIG. 7A-F, FIG. 8 and FIG. 9 show different views of a second embodiment of a multi-layered massage tool 700. FIG. 7A is a front, right and top perspective view of a second embodiment of a multi-layered massage tool 700 and FIG. 7B shows a left side elevation view of the second embodiment of a multi-layered massage tool. FIGS. 7C, 7D, 7E, and 7F show a rear elevation view, a front elevation view, a top plan view, and a bottom plan view of the second embodiment of a multi-layered massage tool 700, respectively. FIG. 8 shows a cross-sectional view of the second embodiment of a multi-layered massage tool 700. FIG. 9 shows an exploded view of the second embodiment of a multi-layered massage tool 700. The following discussion applies equally to FIG. 7A-F, FIG. 8 and FIG. 9, with various parts of the massage tool 700 shown more clearly in some views than in other views. While common reference numbers are used for these drawings, not every feature is labeled with the reference number in every drawing in which it is visible to help enhance the clarity of the drawings.

The multi-layered massage tool 700 has one or more weight plates 910, 915, a first outer layer 732 disposed on the first side of the weight plates 910, 915 to form a first side 730 of the massage tool 700, a second outer layer 722 disposed on the second side of the weight plates 910, 915 to form a second side 720 of the massage tool 700, and one or more massage surfaces 741-744 coupling the first side 730 of the massage tool 700 to the second side 720 of the massage tool 700 and covering at least a portion of the outer edge 911 of the weight plates 910, 915. Any type of material can be used for the various layers 910, 915, 722, 732 of the multi-layered massage tool 700, including, but not limited to any type of plastic, various alloys of steel, other metals or alloys of metals, wood, ceramic materials, and composite materials. In the second embodiment of the multi-layered massage tool 700, first outer layer 732 is made from a first stainless steel part 930, the second outer layer 722 is made from a second stainless steel part 920, and the massage surface 741-744 includes of a portion of the first stainless steel part 930 and the second stainless steel part 920.

In the second embodiment of the multi-layered massage tool 700, the first side 730 and the second side 720 are substantially flat and parallel to each other. The second embodiment of the multi-layered massage tool 700 has a thickness of about 9 mm, a length of about 184 mm, and a height of about 114 mm. The second embodiment of the multi-layered massage tool 700 includes a finger hole 704 through the first outer layer 732, the weight plate 910, 915, and the second outer layer 722. The finger hole 704 is sized to allow one or more fingers to extend through the massage tool 700.

In the second embodiment of the multi-layered massage tool 700, the massage surface 741-744 extends around the massage tool 700 so that the outer edge 911 of the weight plates 910, 915 is entirely covered by the massage surface 741-744. The massage surface 741-744 of the massage tool 700 has a bottom massage surface 741 with a concave contour and a top massage surface 742 with a concave contour, where the contour is the curve created by a silhouette of that portion of the massage surface as viewed from the side. The massage tool 700 also has rear massage surface 743 with a convex contour and a front massage surface 744 with a complex contour having subsections with concave and subsections with convex contours.

Referring now primarily to FIG. 8, which is a cross-sectional view, the four layers of the second embodiment of a multi-layered massage tool 700 can be seen. The location at which the cross-sectional view of FIG. 8 is taken is shown by the cross-section line 8:8 in FIG. 7B. Two portions of the first weight plate 910 are shown in the cross-sectional view of FIG. 8, a first portion 910A and a second portion 910A on opposite sides of the finger hole 704. Two portions of the second weight plate 915 are also shown, a first portion 915A and a second portion 915A on opposite sides of the finger hole 704. Two portions of the first outer layer 732 are also shown, a first portion 732A and a second portion 732B, on opposite sides of the finger hole 704. The first outer layer 732 is disposed on a first side of the first weight plate 910 to form a first side 730 of the massage tool 700. Two portions of the second outer layer 722 are also shown, a first portion 722A and a second portion 722B, on opposite sides of the finger hole 704. The second outer layer 722 is disposed on a second side of the weight plate 910, with the second weight plate 915 interposed between the first weight plate 910 and the second outer layer 722, to form a second side 720 of the massage tool 700. In the embodiment shown, an outer periphery of the first outer layer 732 is joined to an outer periphery of the second outer layer 722 to form a first massage surface 741 and a second massage surface 742 that couple the first side 730 of the massage tool 700 to the second side 720 of the massage tool 700 and cover at least a portion of the outer edge 911 of the first weight plate 910, as well as an outer edge of the second weight plate 915.

The multi-layered massage 700 includes a first section 741 of the massage surface and a second section 742 of the massage surface. The first section 741 includes a first tapered portion coupling the first 730 and second 720 sides of the massage tool 700 to a first rim section having a first cross sectional radius, and the second section 742 includes a second tapered portion coupling the first 730 and second 720 sides of the massage tool 700 to a second rim section having a second cross sectional radius. The first radius of the first rim section of the first section 741 of the massage tool 700 is less than the second radius of the second rim section of the second section 742 of the massage tool 700, and the second radius of the second rim section of the second section 742 of the massage tool 700 is less than one half of a distance from the first side 730 of the massage tool 700 to the second side 720 of the massage tool 700, or less than one half of the thickness of the massage tool 700. This gives the first massage surface 741 a sharper edge, or rim, than the second massage surface 742.

Referring now primarily to FIG. 9, an exploded view of the set of parts 900 of the second embodiment of a multi-layered massage tool 700 is shown. The set of parts 900 includes a right clamshell part 930 and a first weight plate 910 having a first side, a second side opposite from the first side, and an outer edge 911. The set of parts 900 also includes a left clamshell part 920 and a second weight plate 915. In some embodiments, the first weight plate 910 and the second weight plate 915 are identical, but in other embodiments, there may be differences between the two weight plates 910, 915. In some embodiments, one or both weight plates 910, 915 may be fabricated from steel and include a plurality of holes, such as the finger hole 913A and other hole 913B. In the second embodiment of the multi-layered massage tool 700, the two weight plates 910, 915 are identical and are fabricated from steel about 2.2 mm thick with a mass of about 130 g each.

The set of parts 900 are assembled so that the right clamshell part 930 forms a first outer layer 732 disposed on the first side of the first weight plate 910 to form a first side 730 of the massage tool. The left clamshell part 920 is disposed on the second side of the first weight plate 910 to form a second side 720 of the massage tool 700. The second weight plate 915 is positioned between the first weight plate 910 and the left clamshell part 920. A massage surface 741-744 that couples the first side 730 of the massage tool 700 to the second side 720 of the massage tool 700 and covering at least a portion of the outer edge 911 of the weight plates 910, 915 is formed by joining the left clamshell part 920 to the right clamshell part 930. In the second embodiment of the multi-layered massage tool 700, the first outer layer 732 is formed by the right clamshell part 930 and the second outer layer 722 is formed by the left clamshell part 920 both of which are fabricated from stainless steel. The left clamshell part 920 is joined to the right clamshell part 930 by welding a periphery of the left clamshell part 920 to a periphery of the right clamshell part 920 and polishing the weld to create a smooth massage surface 741-744 on the massage tool 700. The finished massage tool 700 has a total mass of between about 440 g and 460 g.

Figure 10:
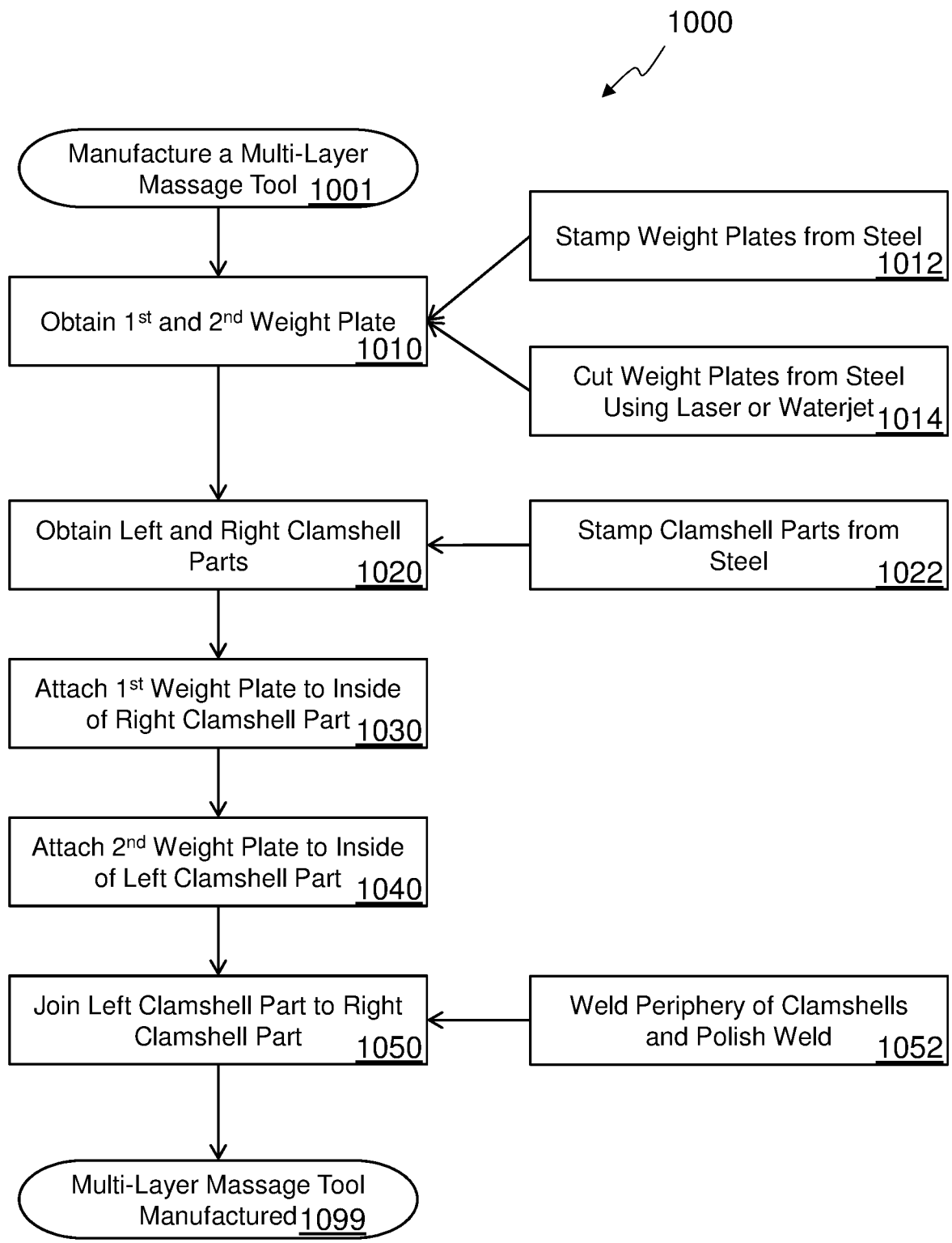
FIG. 10 shows a flow chart of a second embodiment of a method to manufacture a multi-layered massage tool.

FIG. 10 shows a flow chart 1000 of second embodiment of a method to manufacture a multi-layered massage tool. The method of manufacturing a multi-layered massage tool starts at block 1001 and continues by obtaining 1010 a first weight plate and a second weight plate. In some embodiments, the obtaining is accomplished by stamping 1012 the weight plates from steel to form the shape of the outer edge and create a plurality of holes in the weight plates. In other embodiments, the obtaining is accomplished by cutting 1014 the weight plate from steel using a laser or a waterjet to form the shape of the outer edge and create a plurality of holes in the weight plate. In some embodiments, the obtaining is accomplished by purchasing fabricated weight plates from a supplier. The method continues with obtaining 1020 a left clamshell part and a right clamshell part of the massage tool. In some embodiments, the obtaining the clamshell parts is accomplished by stamping 1022 the clamshell parts from a sheet of stainless steel. In other embodiments, the clamshell parts are obtained from a supplier. Any technique can be used to obtain the weight plates and clamshell parts. The first weight plate is attached 1030 to an inside of the right clamshell part and the second weight plate is attached 1040 to an inside of the left clamshell part. The attaching can be done using any suitable method, including, but not limited to, gluing, brazing, or welding. The left clamshell part is joined 1050 to the right clamshell part to form the massage tool. In some embodiments, the left clamshell part and right clamshell part are made of steel, and the joining is accomplished by welding 1052 a periphery of the left clamshell part to a periphery of the right clamshell part and polishing the weld to create a smooth massage surface on the massage tool. The multi-layered massage tool is manufactured at block 1099.

Figure 11A:
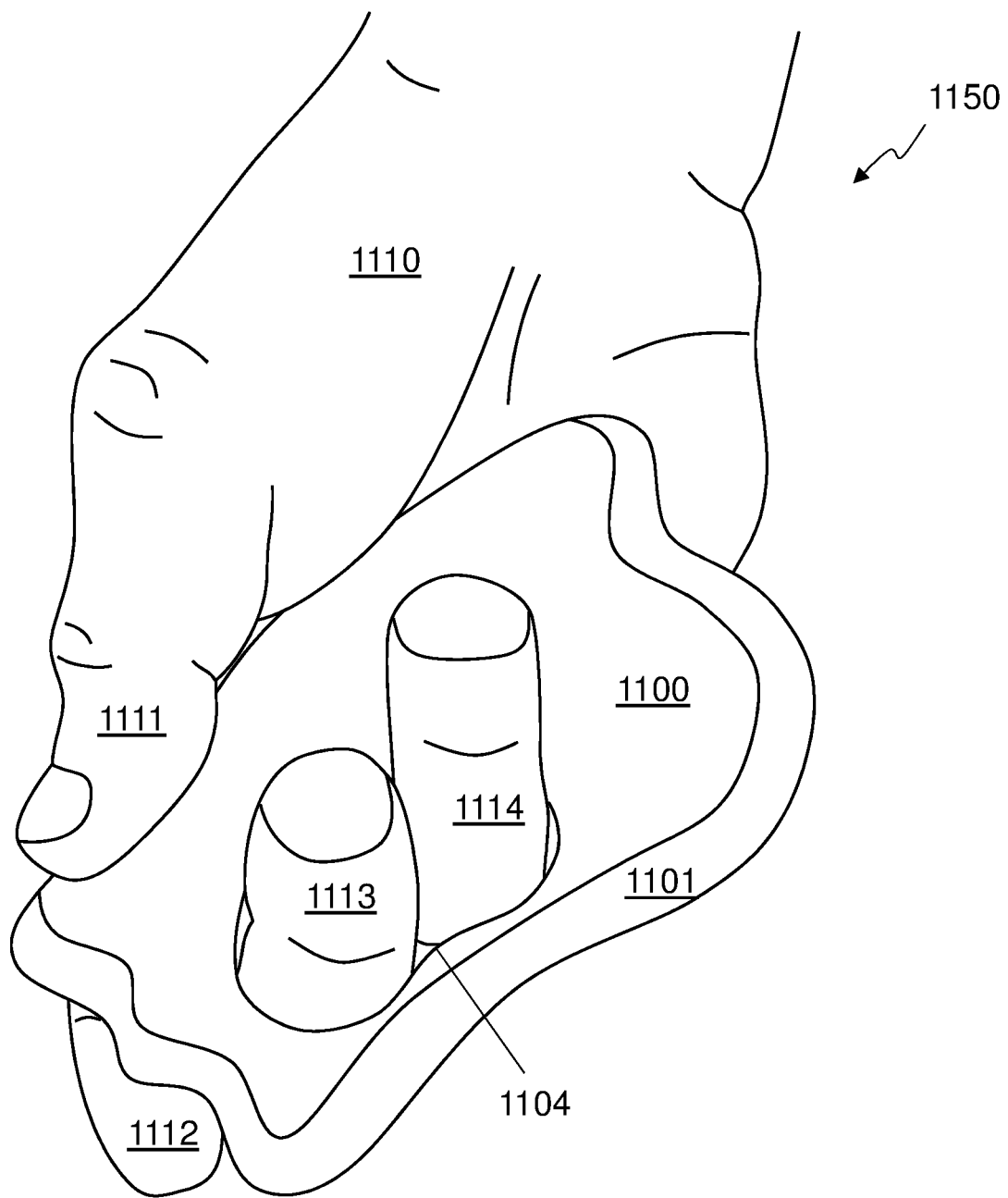
FIG. 11A shows one way to hold a multi-layered massage tool using a hole in the massage tool to facilitate holding the massage tool.

FIG. 11A shows one way to hold 1150 a multi-layered massage tool 1100 using a hole 1104 in the massage tool 1100 to facilitate holding the massage tool 1100. The massage tool 1100 can be held in many different ways, depending on the massage therapist, the surface of the massage tool 1100 being applied to the individual, and the type of massage being performed. In the hold 1150 shown, one hand 1110 is being used to hold the massage tool 1100, with one or more fingers, such as the middle finger 1113 and ring finger 1114 extending through the hole 1104 of the massage tool 1100 and holding the massage tool 1100 against the palm of the hand 1110. So an opening 1104 through the massage tool 1100 sized to allow one or more fingers 1113, 1114 to protrude through the massage tool 1100 can be used to hold the massage tool 1100. The thumb 1111 and the index finger 1112 may be positioned on opposite sides of the massage tool 1100 to steady and direct the massage tool 1100 as it is used to massage the individual (not shown). In at least some cases, an individual can use the massage tool 1100 to massage themselves, and may perform self myofacial massage in some cases.

As pictured in FIG. 11A, the first section 1101 can be used as a surface to massage the individual. The first surface 1101 has a concave contour and a wedge-shaped cross-section with a radiused rim and may be used on various portions of the body, including, but not limited to, arms and legs. The massage tool 1100 can be used in many different ways. One way that the massage tool 1100 can be used while held 1150 in this position is to scrape the first section 1101 over tissue to assess quality of tissue. The first section 1101 may also be used to manipulate fascial tissue. The first section 1101 can be used in a scraping motion with the massage tool 1100 at an acute angle to the tissue being massaged, or perpendicular to the tissue being massaged, depending on the type of massage being performed. At times, the massage tool 1100 is moved against the tissue, but at other times, a static pressure may be applied to the tissue using the massage tool 1100.

Figure 11B:
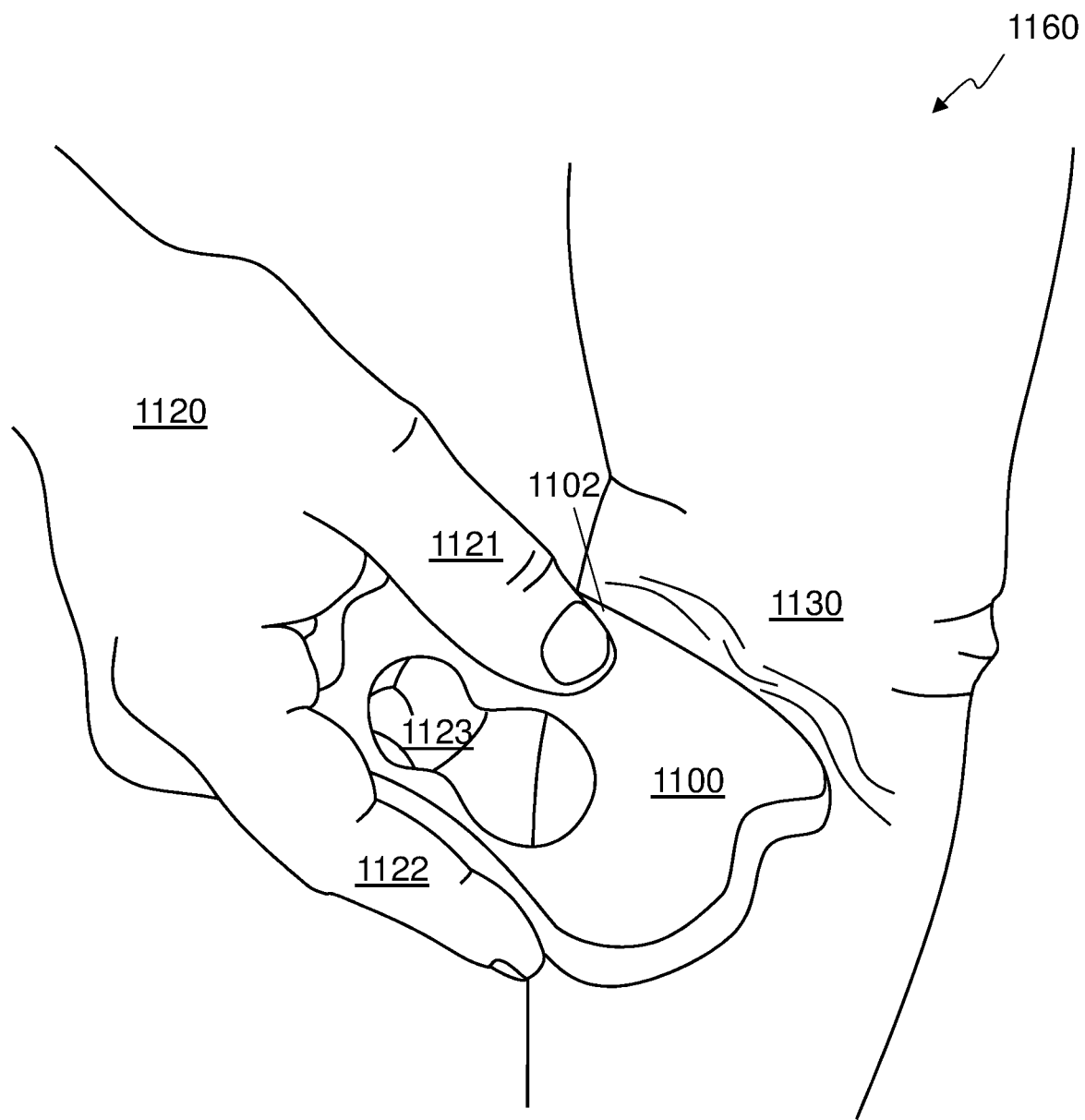
FIG. 11B shows another way to hold the multi-layered massage tool to perform massage using a surface of the massage tool.

FIG. 11B shows another way to hold 1160 the massage tool 1100 to perform massage using a surface of the massage tool 1100. One hand 1120 is used to hold 1160 the massage tool 1100, primarily between the thumb 1121 and the middle finger 1123, with the index finger 1122 held against the rim of the massage tool 1100 to steady and direct the tool and to provide some force on the tool 1100 against the individual being massaged, such as the arm 1130 shown. In some cases, the second section 1102 is used to manipulate fascial tissue, such a fascial tissue of the arm 1130, to improve mobility and function of that tissue. In at least one embodiment, the second section 1102 is used to rub kinesiology tape that has been placed on an individual's body to help activate a pressure sensitive adhesive of the kinesiology tape.

Figure 12:
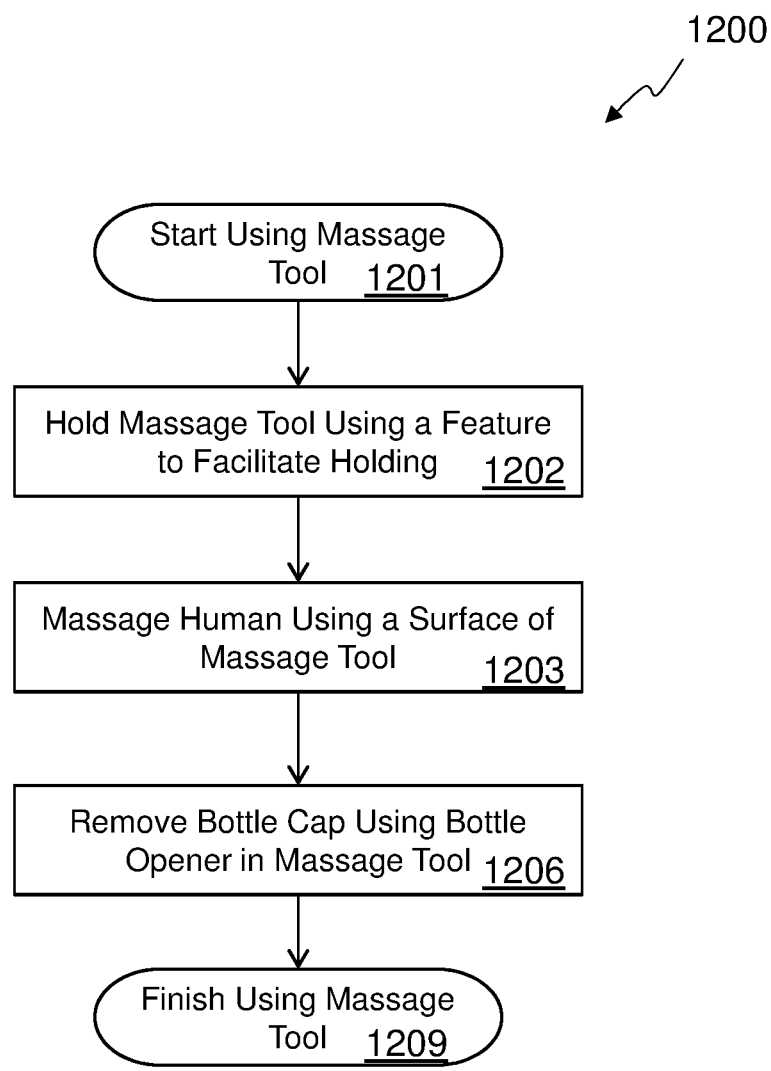
FIG. 12 shows a flow chart of an embodiment of a method of using a multi-layered massage tool.

FIG. 12 shows a flow chart 1200 of an embodiment of a method for using a massage tool. The method starts at block 1201 and continues in some embodiments with holding the massage tool using a gripping feature at block 1202. The gripping feature can be a hole though the massage tool, a handle, textured portions of the tool, or any other type of gripping feature. At block 1203, the method includes massaging a human using a surface of the massage tool. Any surface of the massage tool can be used for any type of massage on any part of a human. In some cases, one individual can hold the massage tool and massage a part of themselves with the massage tool. In some cases massaging the human includes rubbing a piece of kinesiology tape applied to the human with the surface of the massage tool. Sometimes, the method includes removing a bottle cap from a bottle using a bottle opener integrated with the massage tool at block 1206. The method concludes at block 1209.

It should also be noted that, in some alternative implementations, not all the activities shown are performed and/or the activities noted in the block may occur out of the order noted in any of the flowcharts 600, 1000, 1200. For example, activities described in two separate blocks may, in fact, be performed substantially concurrently, or the activities described in two separate blocks may be executed in the reverse order. It will also be noted that each block may be performed by one individual, or by different individuals in any combination.

Examples of various embodiments are described in the following paragraphs:

An example massage tool includes a weight plate having a first side, a second side opposite from the first side, and an outer edge, a first outer layer disposed on the first side of the weight plate to form a first side of the massage tool, a second outer layer disposed on the second side of the weight plate to form a second side of the massage tool, and a massage surface coupling the first side of the massage tool to the second side of the massage tool and covering at least a portion of the outer edge of the weight plate. Some example massage tools also include a first section with a convex contour and a second section with a concave contour. In some example massage tools, the at least a portion of the outer edge of the weight plate covered by the massage surface is at least 90 degrees. In some example massage tools, the outer edge of the weight plate is entirely covered by the massage surface. In some example massage tools, the first section includes a first tapered portion from the first and second sides of the massage tool to a first rim section having a first cross sectional radius, the second section includes a second tapered portion from the first and second sides of the massage tool to a second rim section having a second cross sectional radius, where the first radius is less than the second radius, and the second radius is less than one half of a distance from the first side of the massage tool to the second side of the massage tool. In some example massage tools, the first and second sides of the massage tool are both substantially flat and parallel to each other, and the massage tool has a thickness between about 5 mm and about 30 mm. Some example massage tools also include a finger hole through the first outer layer, the weight plate, and the second outer layer, the finger hole sized to allow one or more fingers to extend through the massage tool. Some example massage tools also include a bottle opener and the bottle opener includes an opening through the first outer layer and the second outer layer, a hole through the weight plate, at least a part of the hole coincident with a part of the opening, and a portion of the weight plate protruding into the opening adapted to catch an edge of a bottle cap. In some example massage tools, the opening and the hole are adapted to allow an one side of the bottle cap to engage with the protrusion while the other side of the bottle cap supports an edge of the opening to allow the massage tool to pry off the bottle cap of a bottle. In some example massage tools, the weight plate includes steel and has a mass of between about 50 grams and 300 grams. In some example massage tools, the first outer layer and the massage surface includes a first plastic part and the second outer layer comprises a second plastic part. In some example massage tools, the weight plate is a first weight plate, and the example massage tool also includes a second weight plate situated between the first weight plate and the second outer later. In some example massage tools, the first outer layer includes a first steel part, the second outer layer includes a second steel part, and the massage surface includes a portion of the first steel part and a portion of the second steel part. In some example massage tools, the weight plate is stiffer than the first outer layer and the second outer layer. Any combination of the examples of this paragraph may be used in embodiments.

An example method of manufacturing a multi-layered massage tool includes obtaining a weight plate having a first side, a second side opposite from the first side, and an outer edge, inserting the weight plate into a first mold, and molding a first plastic part using the first mold to create a first outer layer disposed on the first side of the weight plate. Some example multi-layered massage tools include the weight plate and the first plastic part. In some example methods the first plastic part further comprises a massage surface covering the outer edge of the weight plate. Some example methods also include inserting a first subassembly comprising the weight plate and the first plastic part into a second mold, and molding a second plastic part using the second mold to create a second outer layer disposed on the second side of the weight plate. Some example multi-layered massage tools also include the second plastic part. In some example methods the obtaining includes stamping the weight plate from steel to form the shape of the outer edge and create a plurality of holes in the weight plate. In some example methods the obtaining includes cutting the weight plate from steel using a laser or a waterjet to form the shape of the outer edge and create a plurality of holes in the weight plate. Any combination of the examples of this paragraph may be used in embodiments.

An example method of manufacturing a multi-layered massage tool includes obtaining a first weight plate and second weight plate, obtaining a left clamshell part of a massage tool, obtaining a right clamshell part of the massage tool, attaching the first weight plate to an inside of the right clamshell part, attaching the second weight plate to an inside of the left clamshell part, and joining the left clamshell part to the right clamshell part to form the massage tool. In some example methods the obtaining the first weight plate includes stamping the first weight plate from steel to form an outer edge of the first weight plate and create a plurality of holes in the first weight plate. In some example methods the obtaining the first weight plate includes cutting the first weight plate from steel using a laser or a waterjet to form an outer edge of the first weight plate and create a plurality of holes in the first weight plate. In some example methods the obtaining the left clamshell part comprises stamping the left clamshell from a sheet of stainless steel. In some example methods the left clamshell part and right clamshell part comprise steel, and the joining includes welding a periphery of the left clamshell part to a periphery of the right clamshell part and polishing the weld to create a smooth massage surface on the massage tool. Any combination of the examples of this paragraph may be used in embodiments.

An example method of using a multi-layered massage tool includes massaging a human using a surface of the multi-layered massage tool. In some example methods, the massaging the human includes rubbing a piece of kinesiology tape applied to the human with the surface of the multi-layered massage tool. Some example methods include removing a bottle cap from a bottle using a bottle opener integrated with the multi-layered massage tool. Some example methods include applying the piece of tape to the human. In some example methods the massaging comprises fascial manipulation. Any combination of the examples of this paragraph may be used in embodiments.

The description of the various embodiments provided above is illustrative in nature and is not intended to limit the invention, its application, or uses. Thus, different variations beyond those described herein are intended to be within the scope of the embodiments of the present invention. Such variations are not to be regarded as a departure from the intended scope of the present invention. As such, the breadth and scope of the present invention should not be limited by the above-described exemplary embodiments, but should be defined only in accordance with the following claims and equivalents thereof.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing various principles of the present disclosure. Recitation of numerical ranges by endpoints includes all numbers subsumed within that range (e.g. 1 to 5 includes 1, 2.78, π, and 5).

As used in this specification and the appended claims, the singular forms "a", "an", and "the" include plural referents unless the content clearly dictates otherwise. Thus, for example, reference to an element described as "an opening" may refer to a single opening, two opening, or any other number of openings. As used in this specification and the appended claims, the term "or" is generally employed in its "and/or" inclusive sense, which includes the case where all the elements are included, unless the content clearly dictates otherwise. As used herein, the term "coupled" includes direct and indirect connections. Moreover, where first and second devices are coupled, intervening elements including active elements may be located there between.

Any element in a claim that does not explicitly state "means for" performing a specified function, or "step for" performing a specified function, is not to be interpreted as a "means" or "step" clause as specified in 35 U.S.C. § 112(f).

The description of the various embodiments provided above is illustrative in nature and is not intended to limit the present invention, its application, or uses. As such, the breadth and scope of the present invention should not be limited by the above-described embodiments, but should be defined only in accordance with the following claims and equivalents thereof.

What is claimed is:

1. A massage tool comprising: a weight plate having a first side, a second side opposite from the first side, and an outer edge; a first steel clamshell part, forming a first outer surface of the massage tool, the weight plate directly attached to an inside surface of the first clamshell part; a second steel clamshell part, forming a second outer surface of the massage tool, joined to the first steel clamshell part with an inside surface of the second steel clamshell part facing toward the inside surface of the first clamshell part, wherein the first outer surface of the massage tool and the second outer surface of the massage tool are both substantially flat and parallel to each other; and a massage surface, formed by a joint between the first steel clamshell part and the second steel clamshell part, that covers at least a portion of the outer edge of the weight plate, and comprising at least a first section that includes a first tapered portion from the first outer surface of the massage tool and the second outer surface of the massage tool to a first rim section having a first cross-sectional radius, the first cross-sectional radius being less than one half of a distance from the first outer surface of the massage tool to the second outer surface of the massage tool.

2. The massage tool of claim 1, the massage surface further comprising a second section, wherein one section chosen from between the first section and the second section has a convex contour and the other section has a concave contour.

3. The massage tool of claim 1, wherein the at least a portion of the outer edge of the weight plate covered by the massage surface comprises at least one quarter of the outer edge of the weight plate.

4. The massage tool of claim 1, wherein the outer edge of the weight plate is entirely covered by the massage surface.

5. The massage tool of claim 1, the massage surface further comprising a second section that includes a second tapered portion from the first outer surface of the massage tool and the second outer surface of the massage tool to a second rim section having a second cross-sectional radius that is less than the first cross-sectional radius.

6. The massage tool of claim 1, wherein the massage tool has a thickness between 5 millimeters and 30 millimeters.

7. The massage tool of claim 1, further comprising: a finger hole through the first steel clamshell part, the weight plate, and the second steel clamshell part, the finger hole sized to allow one or more fingers to extend through the massage tool.

8. The massage tool of claim 1, further comprising a bottle opener, the bottle opener comprising: an opening through the first steel clamshell part and the second steel clamshell part; a hole through the weight plate, at least a part of the hole coincident with a part of the opening; and a protrusion of the weight plate protruding into the opening and adapted to catch an edge of a bottle cap; wherein the opening and the hole are adapted to simultaneously allow a first side of the bottle cap to engage with the protrusion of the weight plate and a second side of the bottle cap, opposite the first side, to support an edge of the opening to allow the massage tool to pry off the bottle cap from a bottle.

9. The massage tool of claim 1, wherein the weight plate is a first weight plate; the massage tool further comprising a second weight plate situated between the first weight plate and the second steel clamshell part.

10. The massage tool of claim 9, wherein the second weight plate is directly attached to the inside surface of the second steel clamshell part and the second weight plate is separated from the first weight plate.

11. The massage tool of claim 1, the joint between the first steel clamshell part and the second steel clamshell part comprising a polished weld that joins a periphery of the first steel clamshell part to a periphery of the second steel clamshell part.

12. The massage tool of claim 1, further comprising a first depression in the first steel clamshell part that extends into a hole in the weight plate, and a second depression in the second steel clamshell part substantially aligned with the first depression.

13. A massage tool comprising: a weight plate having a first side, a second side opposite from the first side, and an outer edge; a first outer layer disposed on the first side of the weight plate to form a first outer surface of the massage tool; a second outer layer disposed on the second side of the weight plate to form a second outer surface of the massage tool, wherein the first outer surface of the massage tool and the second outer surface of the massage tool are both substantially flat and parallel to each other; and a massage surface coupling the first outer surface of the massage tool to the second outer surface of the massage tool and covering at least a portion of the outer edge of the weight plate, the massage surface comprising at least a first section that includes a first tapered portion from the first outer surface of the massage tool and the second outer surface of the massage tool to a first rim section having a first cross sectional radius, the first radius being less than one half of a distance from the first outer surface of the massage tool to the second outer surface of the massage tool; wherein a first plastic part comprises the first outer layer and the massage surface, and a second plastic part comprises the second outer layer.

14. The massage tool of claim 13, the massage surface further comprising a second section, wherein one section chosen from between the first section and the second section has a convex contour and the other has a concave contour.

15. The massage tool of claim 13, wherein the outer edge of the weight plate is entirely covered by the massage surface.

16. The massage tool of claim 13, further comprising: a finger hole through the first outer layer, the weight plate, and the second outer layer, the finger hole sized to allow one or more fingers to extend through the massage tool.

17. The massage tool of claim 13, further comprising a bottle opener, the bottle opener comprising: an opening through the first outer layer and the second outer layer; a hole through the weight plate, at least a part of the hole coincident with a part of the opening; and a protrusion of the weight plate protruding into the opening and adapted to catch an edge of a bottle cap; wherein the opening and the hole are adapted to simultaneously allow a first side of the bottle cap to engage with the protrusion of the weight plate and a second side of the bottle cap, opposite the first side, to support an edge of the opening to allow the massage tool to pry off the bottle cap from a bottle.

18. A method of manufacturing a multi-layered massage tool, the method comprising: obtaining a weight plate having a first side, a second side opposite from the first side, and an outer edge; obtaining a first steel clamshell part; obtaining a second steel clamshell part; attaching the weight plate to an inside surface of the first steel clamshell part; and joining the first steel clamshell part to the second steel clamshell part to form a massage surface of the multi-layered massage tool; wherein the multi-layered massage tool includes a first outer surface formed by the first steel clamshell part and a second outer surface formed by the second steel clamshell part that are both substantially flat and parallel to each other; and wherein the massage surface comprises at least a first section that includes a first tapered portion from the first outer surface of the massage tool and the second outer surface of the massage tool to a first rim section having a first cross sectional radius, the first cross sectional radius being less than one half of a distance from the first outer surface of the massage tool to the second outer surface of the massage tool.

19. The method of claim 18, wherein the obtaining the weight plate comprises stamping the weight plate from steel to form an outer edge of the weight plate and create a plurality of holes in the weight plate.

20. The method of claim 18, wherein the obtaining the weight plate comprises cutting the weight plate from steel using a laser or a waterjet to form an outer edge of the weight plate and create a plurality of holes in the weight plate.

21. The method of claim 18, wherein the obtaining the first steel clamshell part comprises stamping the first steel clamshell from a sheet of stainless steel.

22. The method of claim 18, wherein the joining comprises welding a periphery of the first steel clamshell part to a periphery of the second steel clamshell part and polishing the weld to form the massage surface.

* * * * *